(12) United States Patent
Knight

(10) Patent No.: US 7,801,481 B2
(45) Date of Patent: Sep. 21, 2010

(54) SATELLITE NAVIGATION RECEIVER SIGNAL PROCESSING ARCHITECTURE

(75) Inventor: Jerry Eugene Knight, Long Beach, CA (US)

(73) Assignee: Navcom Technology, Inc., Torrance, CA (US)

( * ) Notice: Subject to any disclaimer, the term of this patent is extended or adjusted under 35 U.S.C. 154(b) by 1352 days.

(21) Appl. No.: 11/270,252

(22) Filed: Nov. 8, 2005

(65) Prior Publication Data

US 2007/0105495 A1    May 10, 2007

(51) Int. Cl.
H04B 7/185    (2006.01)

(52) U.S. Cl. .................. 455/12.1; 455/427; 455/13.3

(58) Field of Classification Search ............ 455/12.1, 455/427; 342/357.06, 357.12; 701/13, 213, 701/215; 244/172.5
See application file for complete search history.

(56) References Cited

U.S. PATENT DOCUMENTS

| | | | | |
|---|---|---|---|---|
| 5,347,546 | A * | 9/1994 | Abadi et al. | 375/316 |
| 5,423,076 | A * | 6/1995 | Westergren et al. | 455/86 |
| 5,678,169 | A | 10/1997 | Turney | |
| 5,825,887 | A | 10/1998 | Lennen | |
| 5,923,287 | A * | 7/1999 | Lennen | 342/357.06 |
| 6,313,789 | B1 * | 11/2001 | Zhodzishsky et al. | 342/357.12 |
| 6,675,003 | B1 | 1/2004 | Dubash et al. | |
| 7,471,936 | B2 | 12/2008 | Forrester | 455/147 |

FOREIGN PATENT DOCUMENTS

WO    00/03491    1/2000

OTHER PUBLICATIONS

Gielen, G. et al, "Reconfigurable front-end architectures and A/D converters for flexible wireless transceivers for 4G radios," Emerging Technologies: Circuits and Systems for 4G Mobile Wireless Communications, 2005, 2005 IEEE 7th CAS Symposium on St. Petersburg, Russia Jun 23-24, 2005, IEEE, Jun. 23. 2005, pp. 13-18.
Ganguly S, "Real-Time Dual Frequency Software Receiver," Position Location and Navigation Symposium, 2004, Monterey, Ca, USA Apr. 26-29, 2004, IEEE, Apr. 26, 2004, pp. 366-374.

(Continued)

*Primary Examiner*—Nay A Maung
*Assistant Examiner*—Angelica M Perez
(74) *Attorney, Agent, or Firm*—Morgan, Lewis & Bockius LLP

(57) ABSTRACT

A satellite navigation device including a flexible RF receiver is described. The receiver receives a signal that includes at least one spread-spectrum signal from a first satellite. The receiver has at least a first channel that includes at least two sub-channel circuits. Each sub-channel circuit has at least a first signal generator and a first mixer to receive a respective frequency band in at least the one spread-spectrum signal from the first satellite. The first signal generator provides a respective first signal, having a respective first carrier frequency, to down convert at least a portion of the signal, using the first mixer, to an intermediate frequency that is common to the two sub-channel circuits.

11 Claims, 17 Drawing Sheets

OTHER PUBLICATIONS

International Search Report and Written Opinion of the International Searching Authority dated Sep. 27, 2007.

Amoroso, F., "Adaptive A/D Converter to Suppress CW Interference in DSPN Spread-Spectrum Communications," IEEE Transactions on Communications, vol. COM-32, No. 10, Oct. 1983, pp. 1117-1123.

Maenpa, J.E., et al., "New Interference Rejection Technology from Lecia," Institute of Navigation, Proceedings of the Satellite Navigation Section, Sep. 1997, pp. 1-10.

* cited by examiner

SATELLITE NAVIGATION RECEIVER SIGNAL PROCESSING ARCHITECTURE

FIELD OF THE INVENTION

The present invention relates generally to a global navigation satellite system (GNSS) and more specifically, to a satellite navigation receiver signal processing architecture.

BACKGROUND OF THE INVENTION

Receivers in a global navigation satellite system (GNSS), such as the Global Positioning System (GPS), use range measurements that are based on line-of-sight signals broadcast from satellites. A receiver measures the time-of-arrival of one or more broadcast signals. This time-of-arrival measurement includes a time measurement based upon a coarse acquisition coded portion of a signal, called pseudo-range, and a phase measurement.

In addition to a plurality of broadcast signals in GPS, there are also many other broadcast signals corresponding to other GNSSs, such as the Global Orbiting Navigation Satellite System (GLONASS), the GALILEO positioning system, the European Geostationary Navigation Overlay System (EGNOS), the Wide Area Augmentation System (WAAS), the Multifunctional Transport Satellite-Based Augmentation System (MSAS) and a Quasi-Zenith Satellite System (QZSS). Collectively, GNSS broadcast signals have a variety of formats and are transmitted on a number of carrier signal frequencies.

Conventional GNSS receivers have a plurality of radio frequency (RF) circuits to receive one or more broadcast signals that are transmitted on one or more carrier signal frequencies. The RF circuits typically contain a plurality of sub-channels. A respective sub-channel may be used to receive carrier signals transmitted on a respective carrier frequency or band of frequencies. In addition, the respective sub-channel may be used to receive carrier signals corresponding to a respective satellite in a GNSS.

While the use of a plurality of RF circuits in such conventional receivers enables the receivers to receive multiple signals corresponding to one or more GNSSs, this approach typically entails additional overhead and components, and therefore results in increased complexity and cost. There is a need, therefore, for a flexible RF receiver for GNSS carrier signals.

SUMMARY

A satellite navigation device including a flexible RF receiver is described. The receiver receives a signal that includes at least one spread-spectrum signal from a first satellite. The receiver has at least a first channel that includes at least two sub-channel circuits. Each sub-channel circuit has at least a first signal generator and a first mixer to receive a respective frequency band in at least the one spread-spectrum signal from the first satellite. The first signal generator provides a respective first signal, having a respective first carrier frequency, to down convert at least a portion of the signal, using the first mixer, to an intermediate frequency that is common to the two sub-channel circuits.

The intermediate frequency in a first sub-channel circuit and the intermediate frequency in a second sub-channel circuit may differ by less than 100 kHz. The respective first carrier frequency in the respective first signal and the intermediate frequency of each sub-channel circuit may also be adjustable. This adjustment may be implemented using an adjustable first signal generator.

The first channel may also include a second signal generator. Each of at least the two sub-channel circuits may also include a second mixer. The second signal generator provides a second signal, having a second carrier frequency, to each of at least the two sub-channel circuits in order to down convert at least the portion of the signal, using the second mixer, from the intermediate frequency to substantially baseband.

The receiver in the satellite navigation device may also include an additional channel having at least two additional instances of sub-channel circuits having the intermediate frequency. A respective additional sub-channel circuit receives an additional respective frequency band in an additional spread-spectrum signal from an additional satellite.

In some embodiments, the satellite navigation device includes the receiver that receives the signal that includes at least one spread-spectrum signal from the first satellite. The receiver has the first channel. The first channel includes at least one sub-channel circuit. The sub-channel circuit has the first signal generator and the first mixer to receive the respective frequency band in at least the one spread-spectrum signal from the first satellite. The first signal generator provides the respective first signal, having an adjustable respective first carrier frequency, to down convert at least a portion of the signal, using the first mixer, to an adjustable intermediate frequency.

The first channel may also include the second signal generator. At least the one sub-channel circuit may also include the second mixer. The second signal generator provides the respective second signal, having an adjustable second carrier frequency, to at least the one sub-channel circuit in order to down convert at least the portion of the signal, using the second mixer, from the adjustable intermediate frequency to substantially baseband.

In some embodiments, the satellite navigation device includes the receiver that receives the signal that includes at least one spread-spectrum signal from the first satellite. The receiver has the first channel. The first channel includes at least one sub-channel circuit that receives the respective frequency band in at least the one spread-spectrum signal from the first satellite by down converting at least a portion of the signal to an intermediate frequency. The first sub-channel circuit has a bandpass filter with a central frequency substantially equal to the intermediate frequency and a bandwidth greater than approximately a bandwidth of the first satellite.

In some embodiments, the satellite navigation device includes the receiver that receives the signal that includes at least one spread-spectrum signal from the first satellite. The receiver has a front-end circuit that detects information in the respective frequency band in at least the one spread-spectrum signal from the first satellite. The front-end circuit is configurable to output a digital signal corresponding to the information. The digital signal has an adjustable number of bits.

BRIEF DESCRIPTION OF THE DRAWINGS

Additional objects and features of the invention will be more readily apparent from the following detailed description and appended claims when taken in conjunction with the drawings.

Like reference numerals refer to corresponding parts throughout the several views of the drawings.

DESCRIPTION OF EMBODIMENTS

Figure 1:
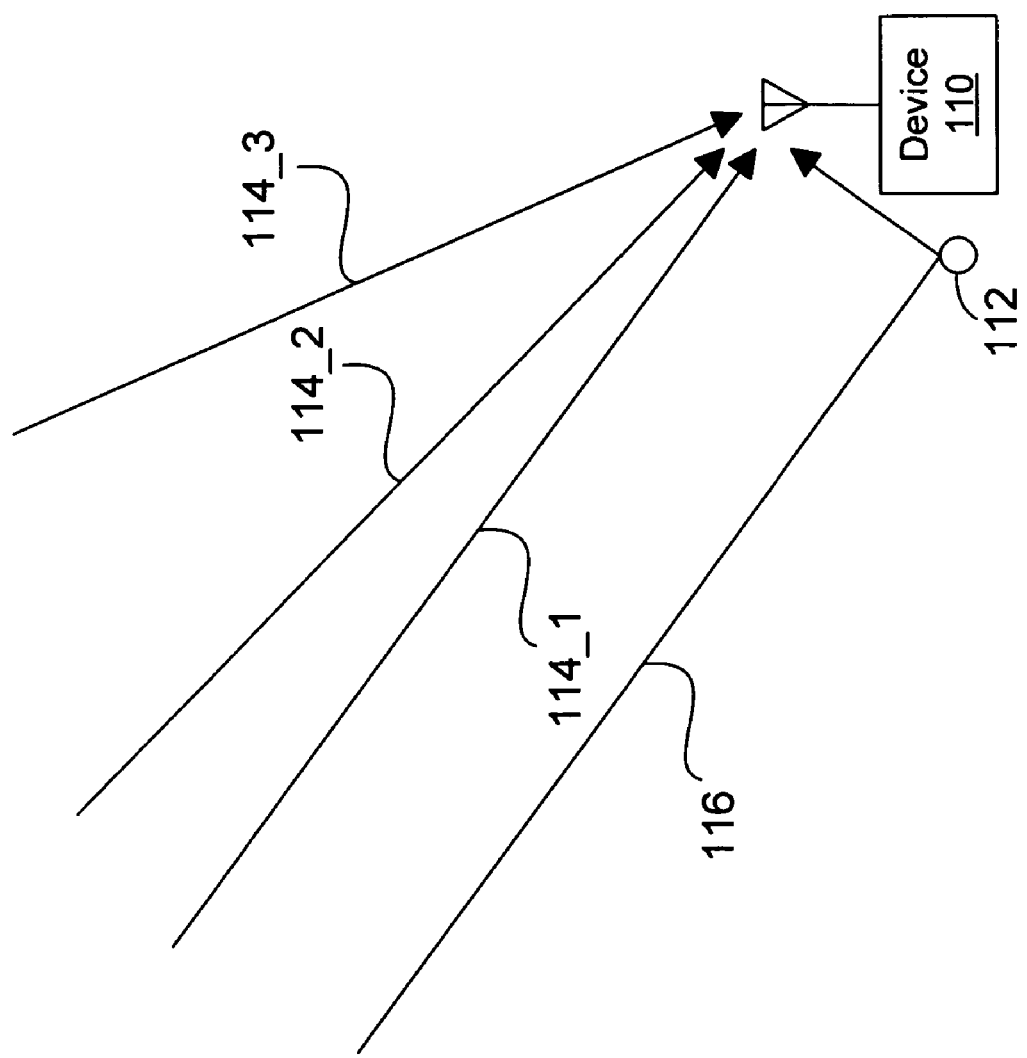
FIG. 1 is a diagram illustrating a global navigation satellite system (GNSS) with direct-path signals and a multi-path signal.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

A satellite navigation device including a flexible RF receiver for receiving one or more spread-spectrum signal from a first satellite is described. Embodiments of the receiver, including at least two sub-channels having a common intermediate frequency, a sub-channel having an adjustable intermediate frequency, a bandpass filter with a central frequency substantially equal to the intermediate frequency and a bandwidth greater than approximately a bandwidth of the first satellite, and/or circuitry that is configurable to output a digital signal having an adjustable number of bits, may reduce a complexity and/or expense of the satellite navigation device.

In the embodiments of the satellite navigation device, navigation is understood to include determining a location or a position, also known as position fixing. Navigation is to be interpreted as determining where the satellite navigation device is with respect to a frame of reference that is at least in part provided by satellites in a GNSS. Navigation may also determine a time at the satellite navigation device based, at least in part, on signals from one or more satellites in a GNSS.

In the satellite navigation device, the RF receiver provides high-quality navigation measurements from any of the existing or planned navigation signals from the GNSSs, including GPS, GALILEO, GLONASS, QZSS, WAAS, EGNOS, MSAS and other satellite navigation systems. It also supports reception of signals from the NavCom Technology, Inc. StarFire Network.

With the exception of GLONASS, GNSS satellites use code diversity multiple access (CDMA) methods to mitigate inter-satellite interference. The non-GLONASS satellites broadcast signals on carrier signal frequencies in an L-band and use spread-spectrum pseudorandom codes. Using GPS as an example, a level of interference protection ranges from about 20 dB for a C/A code to more than 70 dB for newer codes and a military P-code. GPS satellites have on-board filters with bandwidths (double sided) of 20 to 30 MHz.

The GLONASS system uses frequency diversity multiple access (FDMA) to provide inter-satellite interference protection. Each GLONASS satellite uses the same spread-spectrum code. With the exception of antipodal satellites, located in the same orbit on opposite sides of the Earth, each satellite has its own frequency band. Antipodal satellites may share the same frequency band.

The GPS system broadcasts navigation signals at the 1575.42 MHz L1 carrier signal frequency and the 1227.6 MHz L2 carrier signal frequency. A third GPS signal is planned for the 1176.45 MHz L5 carrier signal frequency. The GALILEO system plans to provide signals at L1 and L5 (also called E5A) and additional signals at 1207.14 MHz (E5B) and 1278.75 MHz (E6). GALILEO will also provide additional signals with different spread-spectrum codes at the L1 carrier signal frequency. The QZSS system plans to provide GPS compatible signals on the L1, L2 and L5 carrier signal frequencies. QZSS also plans to provide signals on an as-yet-undefined L6 carrier signal frequency. Satellites in WAAS, EGNOS and MSAS provide GPS-like signals on the L1 carrier signal frequency, and plan to provide a second signal on the L5 carrier signal frequency.

The StarFire network, which functions at least partially as a communications link, uses channels that are 840 Hz wide in a frequency band between 1525 and 1560 MHz. StarFire transmits data at 1200 coded bits per second.

GLONASS broadcasts signals in the 1598.0635 to 1605.375 MHz (L1) and 1242.9375 to 1248.625 MHz (L2) band of frequencies. The bands of frequencies of signals in GLONASS overlap a high-end portion of corresponding bands of frequencies of signals in GPS and GALILEO.

FIG. 1 illustrates a composite signal received by a device 110 in an embodiment of a GNSS 100. The composite signal includes one or more signals 114 broadcast by one or more satellites as well as a multi-path signal 116 that is reflected off an object 112. As discussed above, the signals 114 each contain at least one spread-spectrum signal corresponding to at least one satellite.

Figure 2:
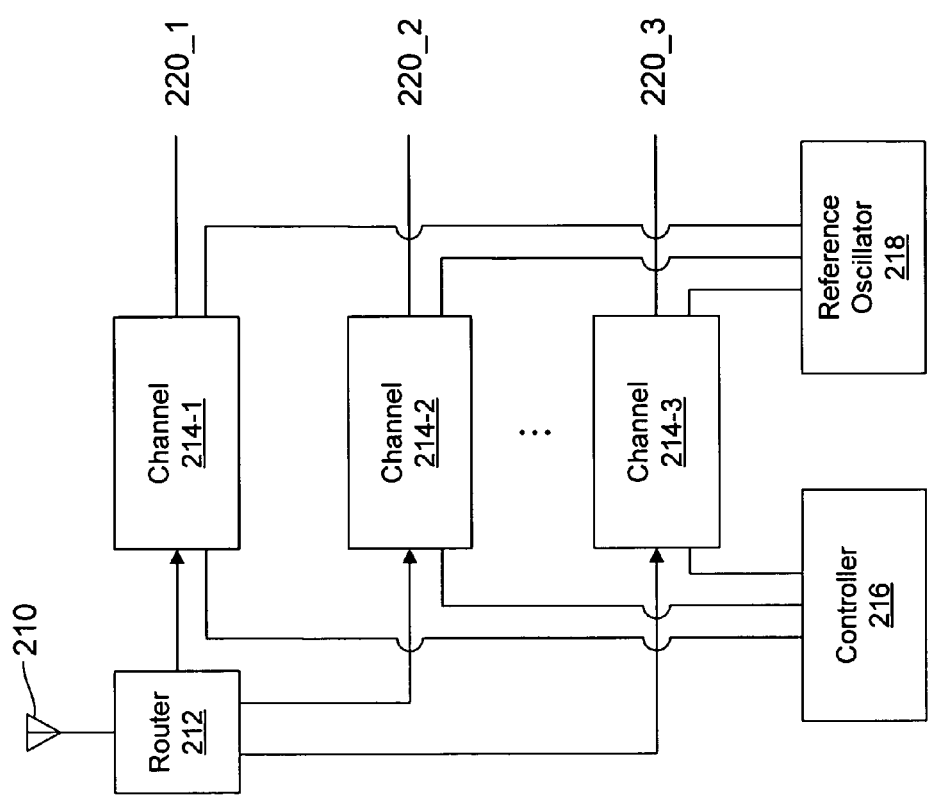
FIG. 2 is a block diagram illustrating components in a GNSS receiver.

FIG. 2 illustrates components in an embodiment of a receiver 200 in the device 110 (FIG. 1). The composite signal is received by at least one antenna 210 and is coupled to a router 212. The router 212 couples at least a portion of the composite signal to one or more channels 214. The channels 214 each include one or more sub-channel circuits that output received information 220. A respective sub-channel circuit receives a respective frequency band in at least the one spread-spectrum signal, corresponding to at least the first satellite, in at least a portion of the composite signal. The channels are controlled by controller 216. As discussed below, adaptation of the respective sub-channel in at least one of the channels 214 may be based on instructions from the controller 216. The channels 214 receive one or more clock signals from at least one common reference oscillator 218. In other embodiments, there may not be a common reference oscillator, such as the reference oscillator 218. The channels

214 may include one or more reference oscillators. One or more of the channels 214 may generate respective clock signals used in receiving at least the one spread-spectrum signal using one or more clock signals, including the use of one or more phase locked loops, delay locked loops and/or interpolation circuits.

In other embodiments, the receiver 200 may have fewer or more components. Functions of two or more components may be implemented in a single component. Alternatively, functions of some components may be implemented in additional instances of the components. While the embodiment 200 illustrates one antenna 210, one router 212 and three channels 214, there may be fewer or more of these components. In addition, the receiver 200 architecture provides options to use a wide variety of antennas. Antenna inputs may be amplified or unamplified (passive) and may combine one or multiple frequencies per antenna connector in the router 212. In embodiments with an unamplified antenna or a long connector or cable between the antenna 210 and the router 212, the receiver 200 may include an initial gain stage.

Figure 4A:
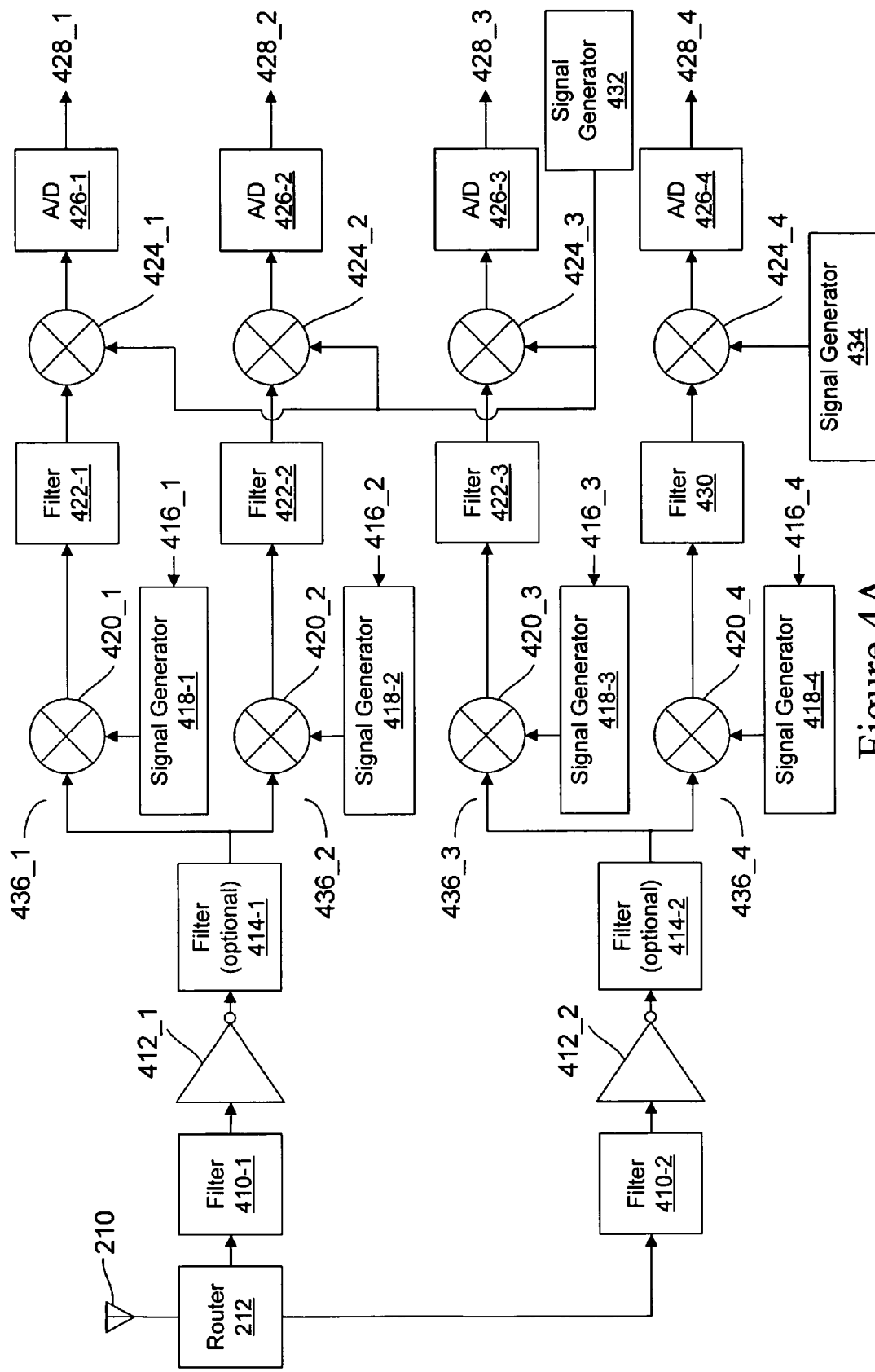
FIG. 4A is a block diagram illustrating components in a channel in a GNSS receiver.

FIG. 4A illustrates an embodiment of a channel 400, such as channel 214-1 (FIG. 2), including several sub-channel circuits 436. At least a portion of the signal from the antenna 210 is split into low- and high-frequency components using the router 212, which in this embodiment is a diplexer. As an example, the low-frequency component may contain the L2 and L5 frequency bands and may span frequencies from 1150 to 1250 MHz. The high-frequency component may contain the L1 and StarFire frequency bands and may span frequencies from 1500 to 1600 MHz. If separate antennas are used for some or all of the frequencies, the router 212 may have additional antenna connectors or there may be additional routers. In some embodiments, such as those with an unamplified (passive) antenna, there may be the initial low-noise amplifier before the router 212.

Each of the diplexed signal branches is coupled to a low loss filter 410 to reject signal images and out-of-band interference. The signal is then amplified in amplifier 412 and optionally filtered in filter 414. In embodiments with the initial low-noise amplifier before the router 212, the amplifier 412 may be eliminated. At least a portion of the signal is down converted to a substantially common intermediate frequency (IF) using one or more modulators, such as mixers 420, in the sub-channel circuits 436. In some embodiments, the IF in a first sub-channel circuit 436_1 and the IF in a second sub-channel circuit 436_2 differ by less than 100 kHz. Filtering of one or more power supply signals and/or ground signal lines may be used in conjunction with the use of the common IF. RF shielding in and/or around one or more sub-channel circuit 436 may also be used.

Down conversion in a respective mixer, such as mixer 420_1, mixes a first reference signal, having a respective first carrier or local oscillator (LO) frequency, that is generated by one signal generator 418, such as signal generator 418-1. The first reference signal may be generated based on one of more clock signal 416, which may be generated by the reference oscillator 218 (FIG. 2). Each first reference signal generated by one of the signal generators 418 has a unique first LO frequency. The IF, however, is substantially common to all of the sub-channels circuits 436. In other embodiments, the IF may be substantially common to at least two of the sub-channel circuits 436, such as the first sub-channel circuit 436_1 and the second sub-channel circuit 436_2. The use of a unique first LO frequency in each of the sub-channel circuits 436, which may include respective first LO frequencies corresponding to the L1, L2, L5, StarFire, E5B and/or L6 bands of frequencies, allows a respective sub-channel circuit to receive a respective frequency band in at least the one spread-spectrum signal from the first satellite.

After down conversion, the signal at the IF is passed through one of the high-quality filters 422, such as surface acoustic wave filters, that remove alias and interference signals and reject out of band interference. The high-quality filters 422 may allow other filters in the channel 400, such as the front-end preselection filtering, to be of lower precision, may allow easier implementation of automatic gain control and may also allow fewer bits quantization in analog-to-digital (A/D) converters 426. A different filter 430 in sub-channel circuit 436_4, corresponding to the StarFire network, may be used since signals in the StarFire network have a narrow information bandwidth. The filters 422 and 430 define a signal processing bandwidth for the signal in the receiver 200 (FIG. 2). As a consequence, the filters 422 and 430 help define overall signal processing characteristics of the receiver 200 (FIG. 2). The use of a substantially common IF and identical filters 422 in the sub-channel circuits 436, corresponding to bands of frequencies in the GNSS that are used for navigation and/or the StarFire network, allows signal processing characteristics of these circuits to be substantially identical. This may offer improved performance, as well as reduced complexity and cost in the receiver 200 (FIG. 2).

In some embodiments, one or more of the filters 422 may have a central frequency substantially equal to the IF and a bandwidth greater than approximately a bandwidth of the first satellite. In some embodiments, the bandwidth (3 dB passband) of one or more of the filters 422 may be greater than approximately 30 MHz (double sided). In some embodiments, the bandwidth (3 dB passband) of one or more of the filters 422 may be within an inclusive range of approximately 30 to 32 MHz (double sided). In an exemplary embodiment, the filters 422 may be equivalent to 6 or more complex poles. By ensuring that the bandwidth of the filters 422 is at least slightly greater than filtering applied to the broadcast signals by one or more of the GNSS satellites, signal content will not be lost and as much out-of-band interference as possible is rejected. If the bandwidth of filters in one or more of the satellites is increased in the future, the bandwidth of one or more of the filters 422 also may be increased, so that signal content will not be lost. This may enable improved multi-path signal 116 (FIG. 1) correction and/or improved tracking characteristics of the receiver 200 (FIG. 2). The filter 430 also may have a central frequency substantially equal to the IF. In an exemplary embodiments, the bandwidth of the filter 430 may be 200 kHz, since the signal in the StarFire network uses a smaller bandwidth.

The signal in one or more sub-channel circuit 436 is converted to substantially near baseband (zero frequency) using one or more modulators, such as mixers 424. Down conversion in a respective mixer, such as mixer 424_1, mixes a second reference signal, having a second carrier or LO frequency, that is generated by signal generator 432. Channel 400 is illustrated with one signal generator 432 since the sub-channel circuits 436 have a substantially common IF. The second reference signal may be generated based on at least one clock signal from the reference oscillator 218 (FIG. 2).

The frequencies of the IF, first LO and second LO may preserve coherent relationships between code and carrier signal frequencies used by GNSS signals. For all GNSS signals, there are a substantially integer number of carrier cycles per code bit. Selected down-conversion frequencies, i.e., the respective first LO frequency and the second LO frequency, may preserve these relationships. Note that the relationships, however, are not sensitive to Doppler frequency shifts caused by satellite-receiver motion, reference signal and/or clock signal errors in the satellite or receiver 200 (FIG. 2). As discussed below, the receiver 200 (FIG. 2) takes advantage of this property.

The IF and the second LO frequency may be substantially identical multiples of a frequency of at least a respective clock signal from the reference oscillator 218 (FIG. 2). Neglecting sources of Doppler (mentioned above), the sum of the two down-conversion frequencies, i.e., the respective first LO frequency and the second LO frequency, in each of the sub-channel circuits 436 may be substantially equal to a respective carrier frequency, corresponding to the respective frequency band, in at least the one spread-spectrum signal from the first satellite. For example, the GPS L1 frequency band has a nominal carrier frequency of 1575.42 MHz, which is equal to 154·10.23 MHz. In embodiments where the receiver 200 (FIG. 2) uses a clock signal form the reference oscillator 218 (FIG. 2) having a frequency of $N_1 \cdot 10.23$ MHz, a first and a second LO are generated from this clock signal. The respective frequencies of these LO may obey several relationships that insure that the range measured by tracking the carrier frequency is substantially the same as the range measured by tracking the code. The carrier frequencies for each of the L-band signals can also be expressed in the form $N_0 \cdot 154$. ($N_0$=154 for L1, 120 for L2, 115 for L5, 118 for E5A and 125 for E6.). The frequency of the first LO is created by multiplying the reference clock signal by A, i.e., $LO_1 = A \cdot N_1 \cdot 10.23$ MHz. The frequency of the second LO is substantially equal to the IF and is created by multiplying the reference clock signal by B, i.e., $LO_2 = B \cdot N_1 \cdot 10.23$ MHz. Multipliers A and B are chosen such that they obey the relationship $s \cdot (N_0 - A \cdot N_1) = B \cdot N_2$, where s=1 for a low-side down conversion and s=−1 for a high-side down conversion. For example, if the high-side first down conversion is used to convert the L1 signal to an IF equal to 13.7·10.23 MHz (=140.151 MHz), s is equal to −1 and $B \cdot N_1$ is equal to 154+13.7 or 167.7. If the low-side down conversion is used instead, s is equal to 1 and $B \cdot N_1$ is equal to 154−13.7 or 140.3. A different multiplier A may be used for each of the GNSS frequencies. The same IF and multiplier B may be used for all frequencies. Note that, in a sense, high-side conversion produces an IF with a negative frequency, but the filters in the receiver 200 (FIG. 2) and subsequent down conversions behave the same for positive and negative frequencies.

Sub-channel circuit 436_4 uses a different second reference signal having the carrier or LO frequency, generated by signal generator 434, to down convert the StarFire signal to substantially near baseband. The second reference signal in sub-channel circuit 436_4 may be generated based on at least one clock signal from the reference oscillator 218 (FIG. 2). Since the signal in the StarFire network uses several different bands of frequencies, this second LO frequency may be adjusted in small, approximately 21 Hz, steps so that the second LO frequency matches a central frequency of the StarFire communication channel. During signal acquisition, the controller 216 (FIG. 2) may sequentially program the signal generator 434 to appropriate frequencies corresponding to each possible StarFire band of frequencies to determine if the respective signal is present. Note that it may not be necessary to maintain special relationships between the code and the carrier signal frequencies in the StarFire signal processing, so there may be more freedom in the selection of the respective first LO frequency and the second LO frequency in sub-channel circuit 436_4.

After down conversion to near baseband, the signal is coupled to a low-pass filter (not shown) to remove unwanted spectral components and is sampled and quantized in one or more of the A/D converters 426 producing digital output 428. Quantization of the signal is discussed further below.

Figure 4B:
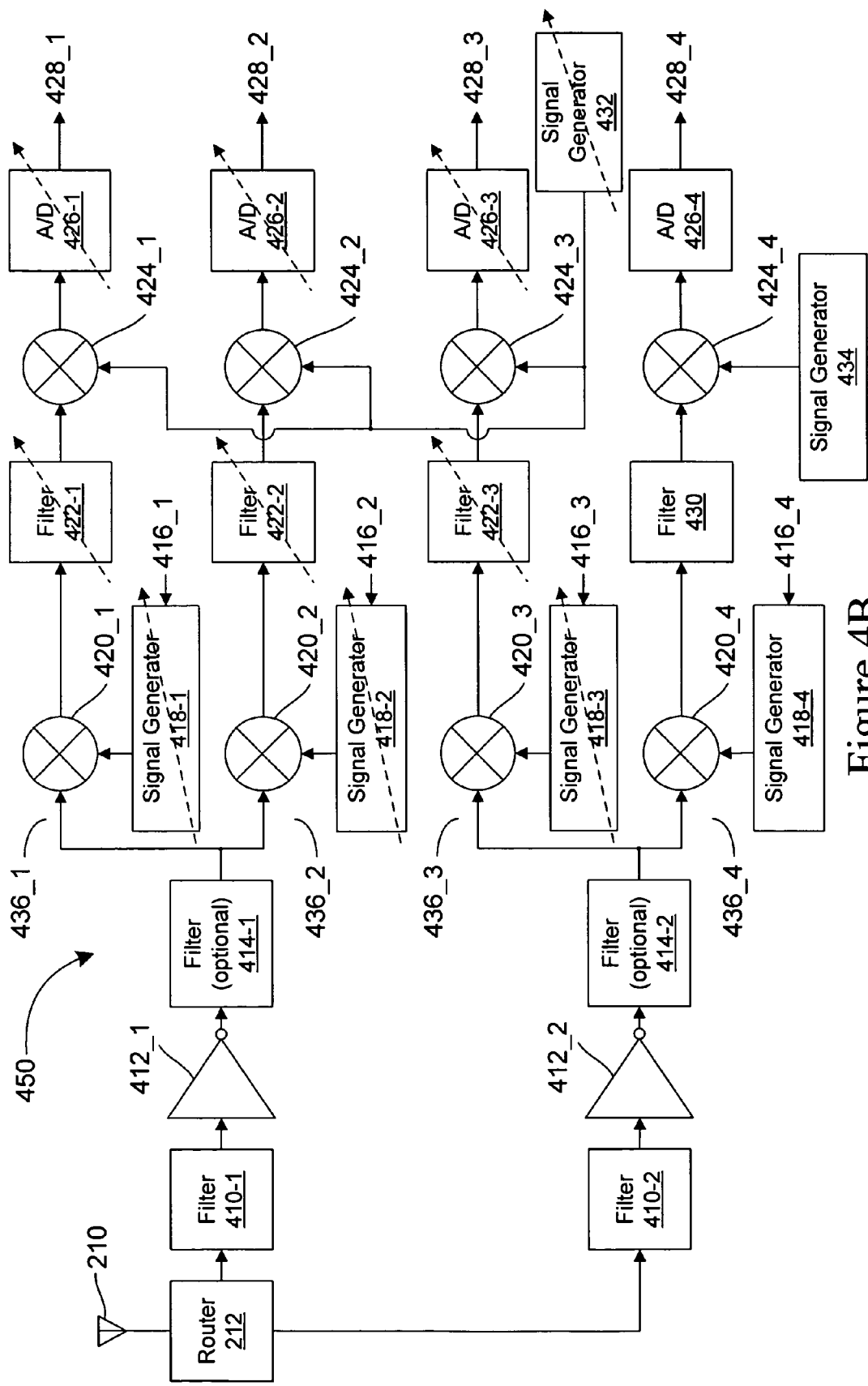
FIG. 4B is a block diagram illustrating components in a channel in a GNSS receiver.

FIG. 4B illustrates an embodiment of the channel 450 that is a variation on the channel 400. In the channel 450, the IF and the first and second LO frequencies in one or more of the sub-channel circuits 436 may be adjustable and/or configurable. This is implemented by adjusting and/or reconfiguring at least one of the signal generators 418 and/or the signal generator 432, for example, using the controller 216 (FIG. 2). For example, the second LO frequency in the reference signal from the signal generator 432 may be adjusted in steps of a few hundred Hz. When adapting or configuring the IF, at least one of the filter 430, the filters 422, the mixers 420 and/or the mixers 424 may be adjusted or reconfigured. In some embodiments of the channel 450, the IF frequency may or may not be common in two or more of the sub-channel circuits 436.

By allowing the IF and the first and second LO frequencies to be configurable, the IF can be configured to a value within an inclusive range of approximately 100 to 350 MHz. Embodiments where the IF and the first and second LO frequencies are adjustable may allow one or more of the sub-channel circuits 436 to be dynamically configured to the IF with the inclusive range. A configurable or adaptable IF offers additional design degrees of freedom. These degrees of freedom may allow the IF in one or more sub-channels 436 to be changed to meet requirements of components, such as filters 410, 414, 422 and/or 430, signal generators 418 and/or 432, and/or mixers 420 and 424. For example, if during a production lifetime of the receiver 200 (FIG. 2), one or more components become obsolete or one or more better components corresponding to a different IF range become available, the IF may be changed by configuring or adapting one or more respective first and second LO frequency. In exemplary embodiments, the IF may be 140, 160 and/or 200 MHz, since these values may match the specifications of low-cost filters and mixers that have been developed for cellular telephones.

In other embodiments, the channel 400 and/or the channel 450 may have fewer or more components. Functions of two or more components may be implemented in a single component. Alternatively, functions of some components may be implemented in additional instances of the components. While FIG. 4A and FIG. 4B illustrate four sub-channel circuits 436, in some embodiments there may be fewer or more sub-channel circuits 436. And, while not shown in FIG. 4A and FIG. 4B, the channel 400 and the channel 450, as well as other embodiments of the receiver 200 (FIG. 2), may use quadrature detection and sampling. This results in complex (in-phase, I, and quadrature, Q) samples and may offer advantages.

Figure 3:
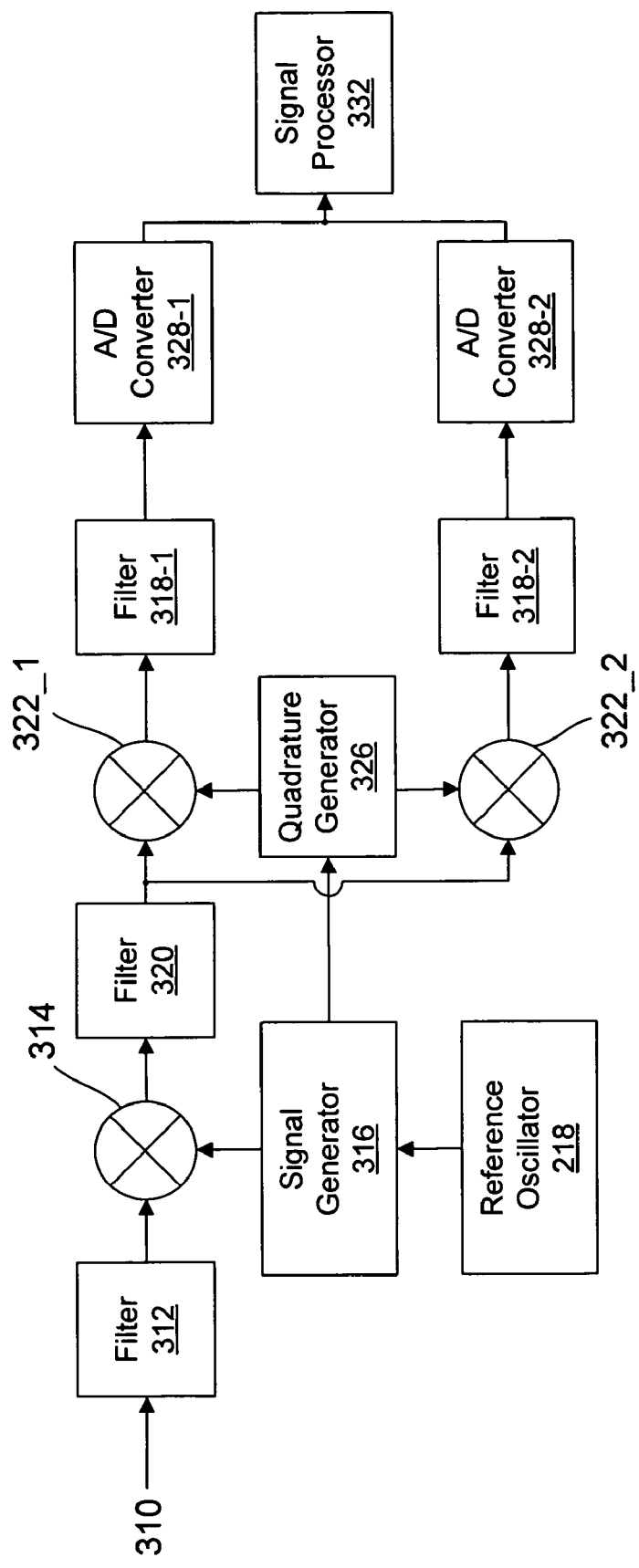
FIG. 3 is a block diagram illustrating components in a channel in a GNSS receiver.

FIG. 3 illustrates components in an embodiment of a sub-channel 300 in one of the channels 214 (FIG. 2) using a quadrature detection and sampling approach. A signal 310 from the router 212 (FIG. 2) is coupled to a low-loss filter 312 to reject signal images and out-of-band interference. An output of the filter 312 is coupled to a modulator, such as mixer 314, where it is down converted to the IF. In some embodiments, the IF is common with one or more additional sub-channel circuits, such as one of the sub-channel circuits 436 (FIG. 4). Down conversion mixes a reference signal that is generated by a signal generator 316 based on the clock signal from the reference oscillator 218 (FIG. 2). The signal at the IF is coupled to a high-quality filter 320 that removes alias signals and rejects out of band interference. This filter 320 defines the signal processing bandwidth for the sub-channel 300. The signal is down-converted to substantially near baseband in modulators, such as mixers 322, yielding complex samples I and Q. Reference signals for the mixers 322 that are substantially in quadrature with one another are provided by quadrature generator 326. The near-baseband signals are low-pass filtered in filters 318 and sampled and quantized in A/D converters 328. Digitized signals corresponding to the complex samples I and Q are coupled to signal processor 322.

Typically, the reference signals from the quadrature generator 326 are not exactly 90° out of phase. If the signal is down converted to baseband, a phase error or bias, and a corresponding signal processing loss, results. As a consequence, conventional receivers typically do not use quadrature detection and sampling as illustrated in FIG. 3. In addition, sampling and quantization is typically not usually at baseband. Instead, sampling and quantization may typically be performed at a residual IF, such as a quarter of a sampling rate of an A/D converter, such as A/D converters 328. By increasing the sampling rate of the A/D converter and averaging samples, the residual bias may be removed. In essence, the A/D converter in these conventional receivers down converts the signal to baseband. However, the resulting I and Q samples are determined over a time interval. This may make correction of the multi-path signal 116 (FIG. 1) more difficult. There may also be a power penalty associated with the increased sampling rate of the A/D converter. In those conventional receivers that implement a down conversion directly from radio frequencies to near baseband, quadrature detection is usually not used.

In the receiver 200 (FIG. 2), the signal is down converted to substantially near baseband and, as previously described, may be sampled and quantized in quadrature. This detection approach allows I and Q samples to be determined substantially simultaneously. This, in turn, may allow improved correction of the multi-path signal 116 (FIG. 1) and lower power consumption. There is, however, still the issue of possible residual bias associated with phase errors in the reference signals from the quadrature generator 326. Down converting to substantially near baseband offers a solution. The resulting signal effectively has an intentional Doppler frequency shift. By performing a complex phase rotation to correct for this intentional Doppler frequency shift, the bias is substantially uniformly distributed over 0-360° and averages to zero.

Figure 9:
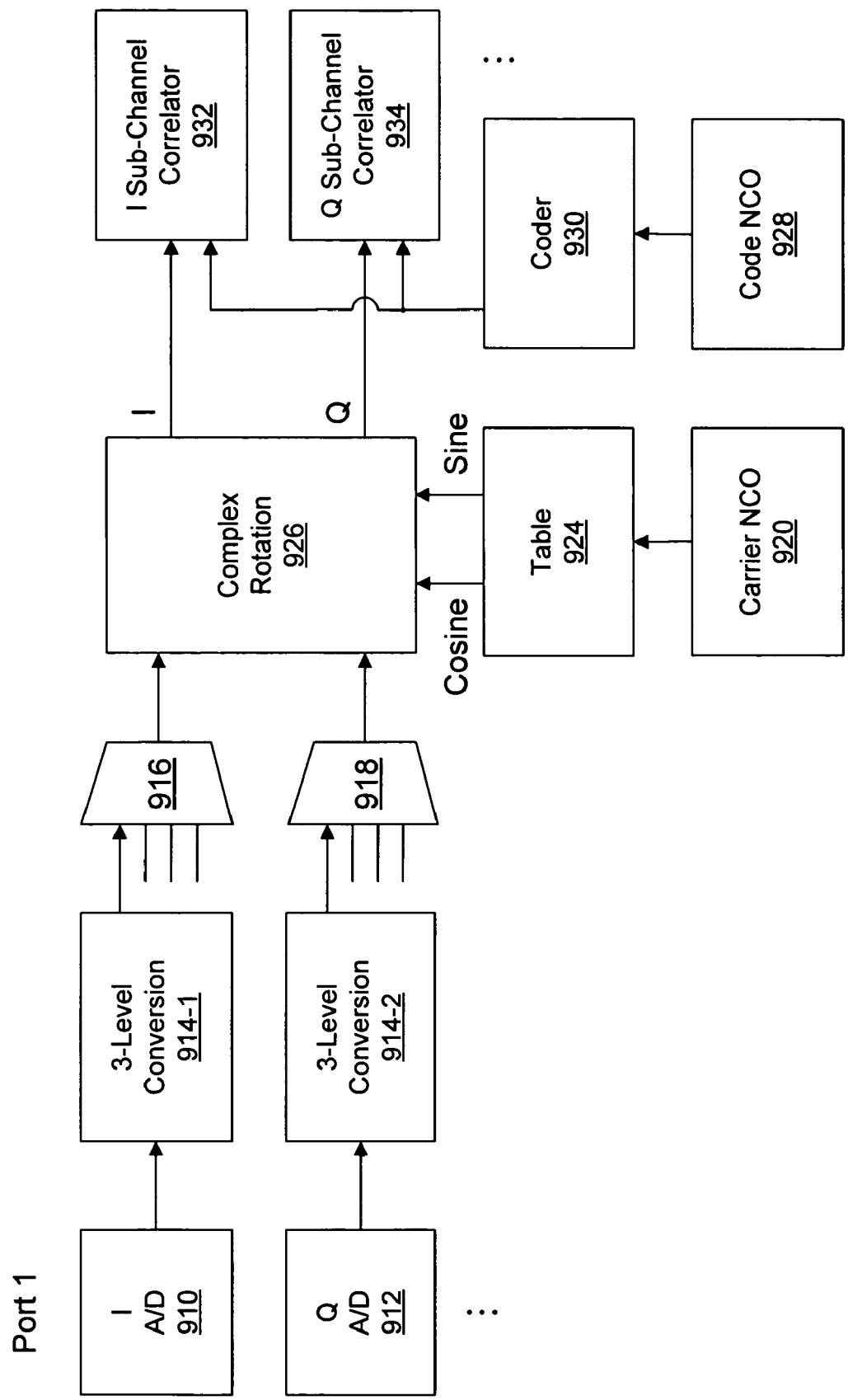
FIG. 9 is a block diagram illustrating signal processing of received signals in a GNSS receiver.

FIG. 9 illustrates an embodiment of a signal processing circuit 900 including the complex phase rotation. A/D converters 910 and 912 (such as A/D converters 328 in FIG. 3 and A/D converters 426 in FIG. 4A) provide I and Q samples, respectively. The A/D converters 910 and 912 are a first port to the signal processing circuit 900 for the first sub-channel circuit. Thus, the first port corresponds to a sub-channel receiving data at a single carrier frequency in the signal. There may be one or more additional ports from additional sub-channel circuits coupled either to the signal processing circuit 900 or additional instances of the signal processing circuit 900. In embodiments with a multi-frequency antenna, a separate sub-channel and port may be used for each carrier frequency in the signal. In embodiments with multiple antennas, such as in an attitude determination system, a separate port may be needed for each carrier frequency in the signals from each antenna.

The I and Q samples are coupled to 3-level converters 914, which are discussed further below in the discussion of the quantization of the signal. The samples are coupled to multiplexers 916 and 918, which couple the remainder of the signal processing circuit 900 to at least one of the ports. Complex rotation to correct for the residual bias and the intentional Doppler frequency shift associated with down conversion to substantially near baseband (for example, by forcing the Q samples to equal 0) is performed in complex rotation circuit 926. The complex rotation is based on a value in look-up table 924. The value is determined based on a carrier signal generator or numerically controlled oscillator (NCO) 920, which is part of a carrier tracking loop that determines the intentional Doppler frequency shift to be corrected. At least the one spread-spectrum code in the samples of the signal is demodulated in correlators 932 and 934 based on a coder 930 and a code signal generator or NCO 928, which is part of a code tracking loop.

The receiver 200 (FIG. 2) has several embodiments for converting one or more GNSS signals from analog to digital form. As is known in the art, a sampling rate equal to or greater than a Nyquist rate of the signals is acceptable. In embodiments where complex samples are used, the sampling rate may be greater than or equal the bandwidth of the filters 422 (FIG. 4A). For example, for GPS signals the sampling rate may be greater than 32 MHz. In other exemplary embodiments, the sampling rate may be 40, 60 or 80 MHz. Since power consumption and timing constraints during signal processing increase in proportion to the sampling rate, a 40 MHz sampling rate may be suitable for existing and planned GNSS signals. If future, higher-bandwidth GNSS signals become available, the bandwidth of the filters 422 (FIG. 4A) and the sampling rate of the A/D converters 426 (FIG. 4A) may be increased accordingly based on the new Nyquist rate.

Referring to FIG. 4B, in some embodiments one or more sub-channel circuits 436 in the channel 450 may be configurable to output one or more digital signals 428 having an adjustable number of bits. The number of bits may be 1, 2, 3, 4 or 5. In some embodiments, a larger number of bits may be used. However, a complexity of an A/D converter, such as the A/D converters 426 varies as a square of the number of bits and there may be diminishing returns as the number of bits is increased beyond 5. The number of bits may be configured or adapted, including dynamic adaptation. The configuring and/or adapting may be controlled by the controller 216 (FIG. 2). The A/D converters 426 illustrate this capability. In embodiments where one or more sub-channel circuits 436 are configured to output digital signals 428 having 1 bit, one or more of the A/D converters 428 may be replaced with a comparator.

Figure 5A:
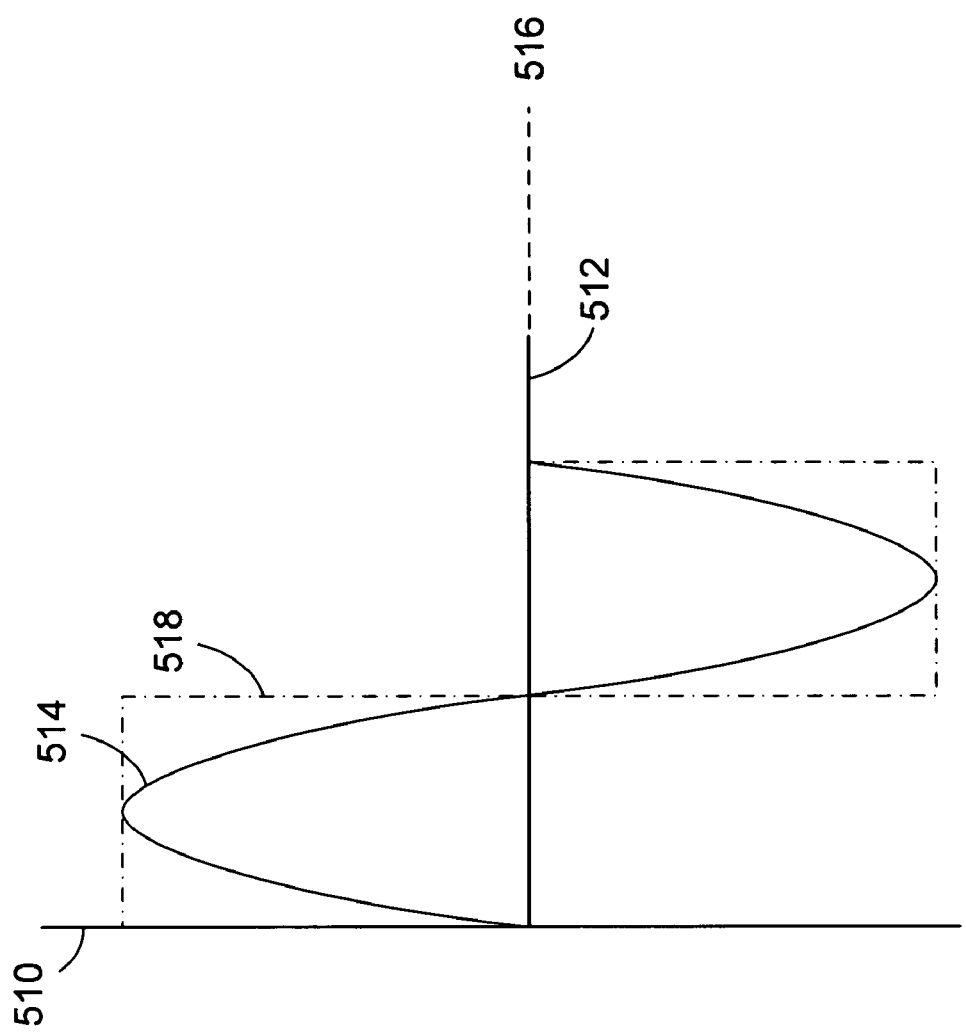
FIG. 5A illustrates 1-bit (2-level) quantization.
Figure 5B:
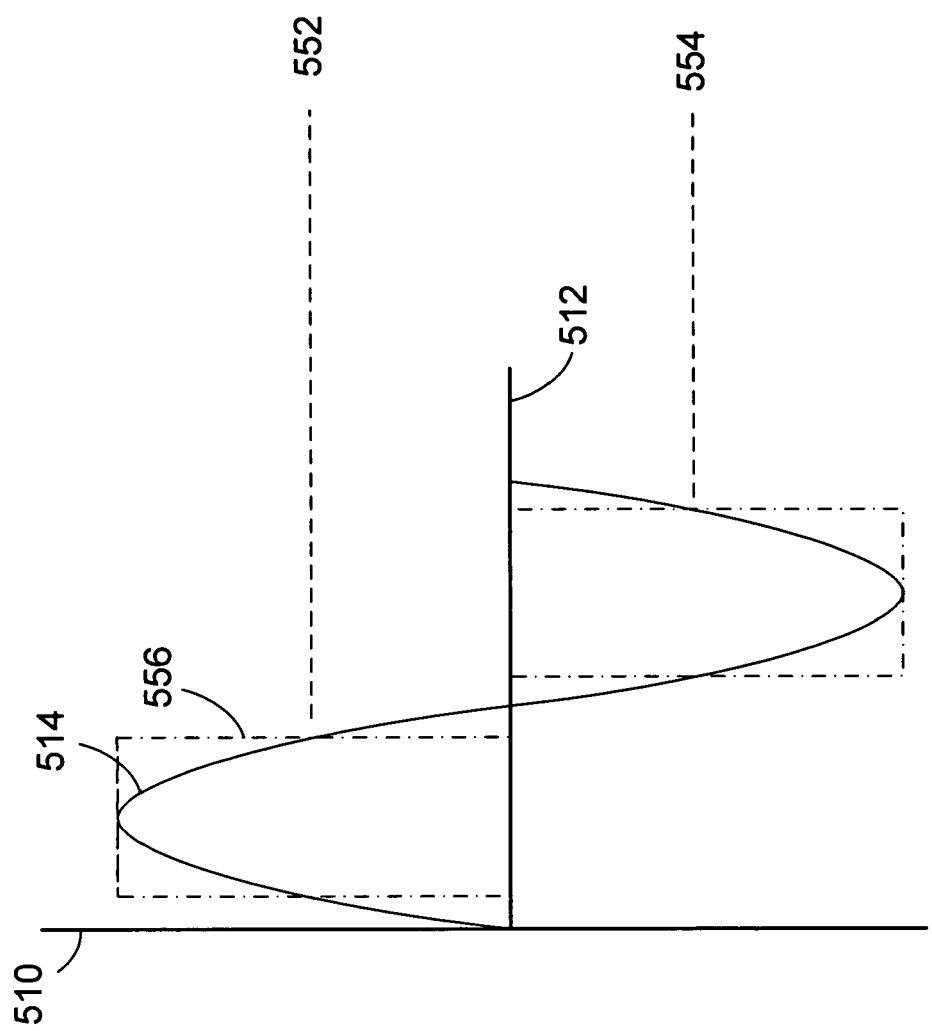
FIG. 5B illustrates 2-bit (3-level) quantization.
Figure 5C:
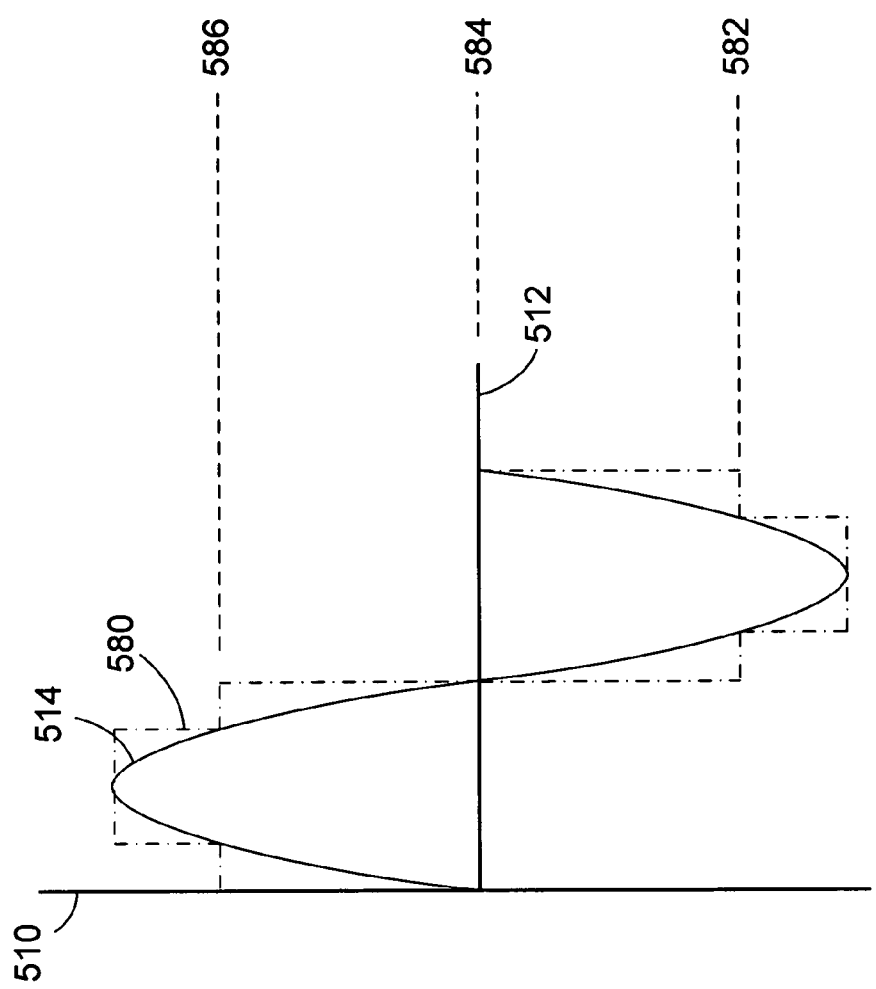
FIG. 5C illustrates 3-bit (4-level) quantization.

FIGS. 5A-5C illustrate several quantization embodiments. In FIG. 5A, showing a magnitude 510 versus time 512 for a signal 514, a 1-bit (2-level) quantization relative to a reference voltage or threshold 516 is shown. An error between quantized signal 518 and the signal 514 is apparent. In FIG. 5B, a 2-bit (3-level, i.e., 1, 0 and −1) quantization relative to reference voltages or thresholds 552 and 554 is shown. The error between quantized signal 556 and the signal 514 is also apparent. The error, however, is reduced, in much the same way as the error in numerical integration using Simpson's rule is reduced as an interval Δx along the time axis 512 is reduced. In FIG. 5C, a 3-bit (4-level) quantization relative to reference voltages or thresholds 582, 584 and 586 is shown. The error between quantized signal 580 and the signal 514 is further reduced. While not shown, there is also a 2-bit (4-level) embodiment.

One of these or another conversion techniques may be selected to convert the analog GNSS signals to digital format. The selected technique will vary according to the target application for the receiver 200 (FIG. 2). A multi-bit A/D converter provides an improved level of anti-jamming protection (some 6 dB per bit), has improved automatic gain (AGC) range, has a small amount of processing loss (as evidence by the reduced error between the original signal and the quantized samples) and provides a large dynamic range. However, such a multi-bit A/D converter consumes more power and is more expensive. In addition, the complex rotation circuit 926 (FIG. 9) may need full sine and cosine values from the look-up table

924 (FIG. 9). One-bit, hard-limit samplers, that produce samples such as those illustrated in FIG. 5A, have a low cost, a small size and consume a least amount of energy. Such one-bit samplers lack jam resistance and dynamic range. They also incur a −1.96 dB signal processing loss. 3-level samplers, that produce samples such as those illustrated in FIG. 5B, are more complex and slightly more expensive than hard-limit samplers. The signal processing loss is reduced to −0.92 dB. They provide more dynamic range and jam resistance than hard-limit samplers, but not as much as multi-bit samplers. Note that with 2-bit samples, the complex rotation circuit 926 (FIG. 9) may be implemented by setting the sign of the result equal to the XOR of the sign bits from the measurement and table value. The magnitude of the result is zero if the magnitude bit of the 2-bit sample is zero or is the magnitude of the table value if the magnitude bit of the 2-bit sample is one.

In some embodiments, the receiver 200 (FIG. 2) may combine two or more of the conversion techniques to achieve improved performance. For example, a multi-bit A/D converter may be used and the I and Q samples may be converted to 3-level signals using the 3-level converters 914 (FIG. 9). In this way, the receiver 200 (FIG. 2) may have improved jamming resistance and improved AGC range, and still achieve the ease of 3-level samples for digital signal processing.

Since the information content of the StarFire signal (1200 or 2400 bits per second) is much smaller than for the GNSS signals, a lower sampling rate may be used, such as 38.4 kHz. This rate is 16 or 32 times the Nyquist rate and facilitates possible future increases in a broadcast data rate. It also allows synchronization of data bit edges with asynchronous digital samples without a significant loss of signal power.

Referring back to FIG. 2, the reference oscillator 218 generates at least the one clock signal that is used in one or more of the channels 214 to generate, for example, the respective first LO frequencies, the second LO frequency and/or timing for the A/D conversions. As discussed previously, down conversion in the channels 214 is ultimately to substantially near baseband. This effectively introduces the intentional Doppler frequency shift. One way to implement this is to set the carrier frequency of at least the one clock signal such that it is about 40 parts per million (PPM) too fast. This offset ensures that the I and Q samples of one of more of the signals all have a positive apparent Doppler frequency shift, which simplifies the design of signal generators, such as NCOs, in signal processing circuits, such as signal processing circuit 900 (FIG. 9). The offset also ensures that digital sampling edges are randomly distributed with respect to a timing of code bit edges in at least the one spread-spectrum signal from at least the first satellite.

In an exemplary embodiments, the reference oscillator 218 has a nominal carrier frequency of 16.36864 MHz. This is 39.101 MHz or approximately 40 PPM larger than 1.6 times the GPS 10.23 MHz fundamental frequency. The carrier frequency of at least the one clock signal from the reference oscillator 218 may vary over its lifetime by another 10 PPM due to aging and/or temperature variations.

In other exemplary embodiments, the reference oscillator 218 may include a temperature compensated crystal oscillator (TCXO) and/or a voltage compensated crystal oscillator (VCXO). For GPS, both types of crystal oscillators may have a frequency that is substantially the same as the nominal 16.36864 MHz carrier frequency of at least the one clock signal. The TCXO contains a compensation circuit that removes some, but not all, of the temperature variation in the reference crystal oscillator and a thermistor. The thermistor outputs a voltage that is proportional to a temperature of the crystal oscillator. Signal processing software may read the thermistor and predict an actual frequency of the crystal oscillator to a precision of a few parts per billion, which is equivalent to a few Hertz of Doppler frequency shift at the carrier frequencies of the GNSS signals.

The receiver 200 may optionally generate a timing pulse called a PPS (pulse per second) that is precisely aligned to a one second mark of a Universal Time Coordinate (UTC) or GPS time. The receiver 200 has a very precise knowledge of the time, typically a few nanoseconds, because it may solve for the time and frequency error of a sampling clock as part of a position solution. However, when a TXCO is used in the reference oscillator 218, a number of samples per second is not necessarily an integer due to variations in the TCXO frequency. Typically, the receiver 200 generates the PPS at an edge of the clock signal that is nearest to a one second epoch in the GPS signal. In an exemplary embodiment of the receiver 200, the one second epoch has a precision of plus or minus 12 ns. Over time, a time alignment of the edge of the clock signal and the PPS drifts. Periodically, the receiver 200 may add or subtract one or more clocks cycles to a PPS interval to keep the error bounded. A user of the PPS may compensate for a corresponding glitch in the PPS interval. It is common practice to output a message that describes an estimate by the receiver 200 of the error in the PPS due to discrete alignment of edges of the clock signal. This message tells the user when glitches occur, i.e. when the PPS is corrected.

The reference oscillator 218 including the VCXO accepts a variable voltage feedback signal that adjusts the frequency of at least the one clock signal. Navigation software in the satellite navigation device may adjust the feedback voltage so that there are an integer number of clock signal cycles per second and the PPS occurs precisely at the estimated second mark. In these embodiments, additional adjustments of the PPS may not be needed.

In some embodiments, feedback may be provided to one or more of the channels 214 in the receiver 200 to control a gain in one or more sub-channel circuit, such as sub-channel circuit 436_1 (FIG. 4A), and/or to calibrate one or more A/D converters, such as A/D converter 426-1 (FIG. 4A). The feedback may be provided based on the signal after the A/D converters 328 (FIG. 3) and before the signal processor 332 (FIG. 3) using, for example, an interface circuit. The interface may also modify an input to the signal processor 332 (FIG. 3), i.e., the samples I and Q, to improve anti-jamming performance of the receiver 200. The interface may also transform the I and Q samples into a 3-level, sign-magnitude format. As discussed previously, in this way the receiver 200 may enjoy the advantages of multi-bit A/D samples and signal processing of 3-level signals.

In some embodiments of the transformation of the I and Q samples, a signal line with a 1-bit sample is coupled to a most significant bit of input pins in the signal processor 332 (FIG. 3). Other input pins may be coupled to a logical zero. In another embodiment, 2-bit, 3-level sampling may be selected. Signal lines for the two bits may be coupled to two most significant bits of the input pins and the other input pins may be coupled to a logical zero. In embodiments where three or more bit A/D conversions are used, signal lines with the corresponding bits may be coupled to the most significant bits of the input pins and the other input pins may be coupled to a logical zero.

Figure 6:
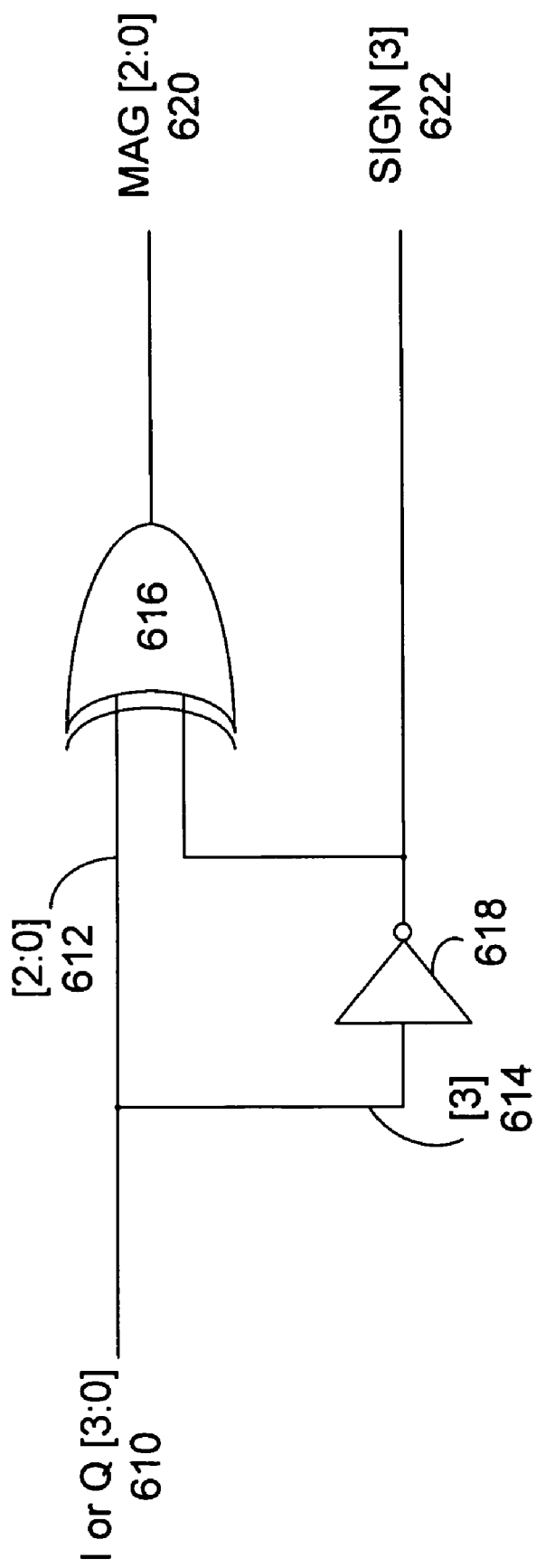
FIG. 6 is a block diagram illustrating a sign-magnitude conversion circuit.

FIG. 6 illustrates an embodiment of the sign, magnitude conversion, such as that which may be implemented in 3-level converters 914 (FIG. 9), using 4-bit A/D samples 610. The 4-bit A/D samples 610 are mapped to a sign-magnitude format with a 1-bit sign 622 and a 3-bit magnitude 620, using inverter 618 and XOR 616 operating on a least significant three bits 612 and a most significant bit 614, respectively. The A/D samples 610 range from 0 to 15, with a zero point half way between values 7 and 8 (assuming that the zero point is adjusted properly). A/D samples 610 of 0 and 15 have a largest magnitude. The sign 622 of a sign-magnitude value is an inverse of the most significant bit 614 of a respective A/D sample. For positive sign values, the magnitude 620 is equal to the least significant A/D bits 612. For negative sign values, the magnitude 620 is a bit-wise inverse of the least significant A/D bits 612.

In some embodiments, a programmable look-up table may be used to map the A/D samples 610 into 3-level samples, such as the 3-level converters 914 (FIG. 9). The 3-level samples may be used by digital signal processing, such as in signal processor 332 (FIG. 3). The programmable look-up table may allow A/D converters 426 (*Figure* 4A) to utilize between 1 and 4-bit quantization. The programmable look-up table may contain 16 elements, one for each of 16 possible inputs from a 4-bit A/D. Each element is programmed with an equivalent 3-level, sign/magnitude value. A single look-up table defines conversions used by both I and Q samples 610 corresponding to one or more signals from one or more sub-channel circuits 436 (FIG. 4A).

If the input samples to the programmable look-up table are from a 1-bit, hard-limit A/D converter, there are only two possible input values: 1000 and 0000 (binary). Control logic in conjunction with the programmable look-up table may convert a binary 1000 to a positive sign and large magnitude, and a binary 0000 to a negative sign and large magnitude. In this example, a remaining 14 entries in the programmable look-up table are not used. If a 2-bit (3-level) A/D conversion is used, the control logic in conjunction with the programmable look-up table may convert each of four possible 3-level A/D samples into a corresponding 3-level sample for signal processing. Mapping of 2-bit (4-level) A/D samples, as well as for a larger number of bit A/D samples, may be implemented in an analogous manner.

For proper performance of the receiver 200 (FIG. 2), equal numbers of positive and negative A/D samples 610 are desired. If the A/D samples 610 do not average to zero, they contain a bias, also called a DC bias, that during the code correlation process (932 and 934 in FIG. 9) will be converted to additional interfering noise, or, if the DC-bias is larger than an auto-correlation protection provided by a respective spread-spectrum CDMA code, will appear as an interfering satellite signal.

One approach for removing DC-bias is to average the A/D samples 610 for a period and subtract the resulting average from the incoming A/D samples 610. This approach, however, may use many bits of precision in the de-biased A/D samples, and consequently many bits of precision during signal processing. Other methods include hand or software calibration of the DC-biases. These methods measure the DC-bias and adjust A/D reference voltages, such as the reference voltages 552 and 554 (FIG. 5B), by manually adjusting components in the receiver 200 (FIG. 2) or providing a variable feedback voltage using a digital to analog (D/A) converter.

Figure 7:
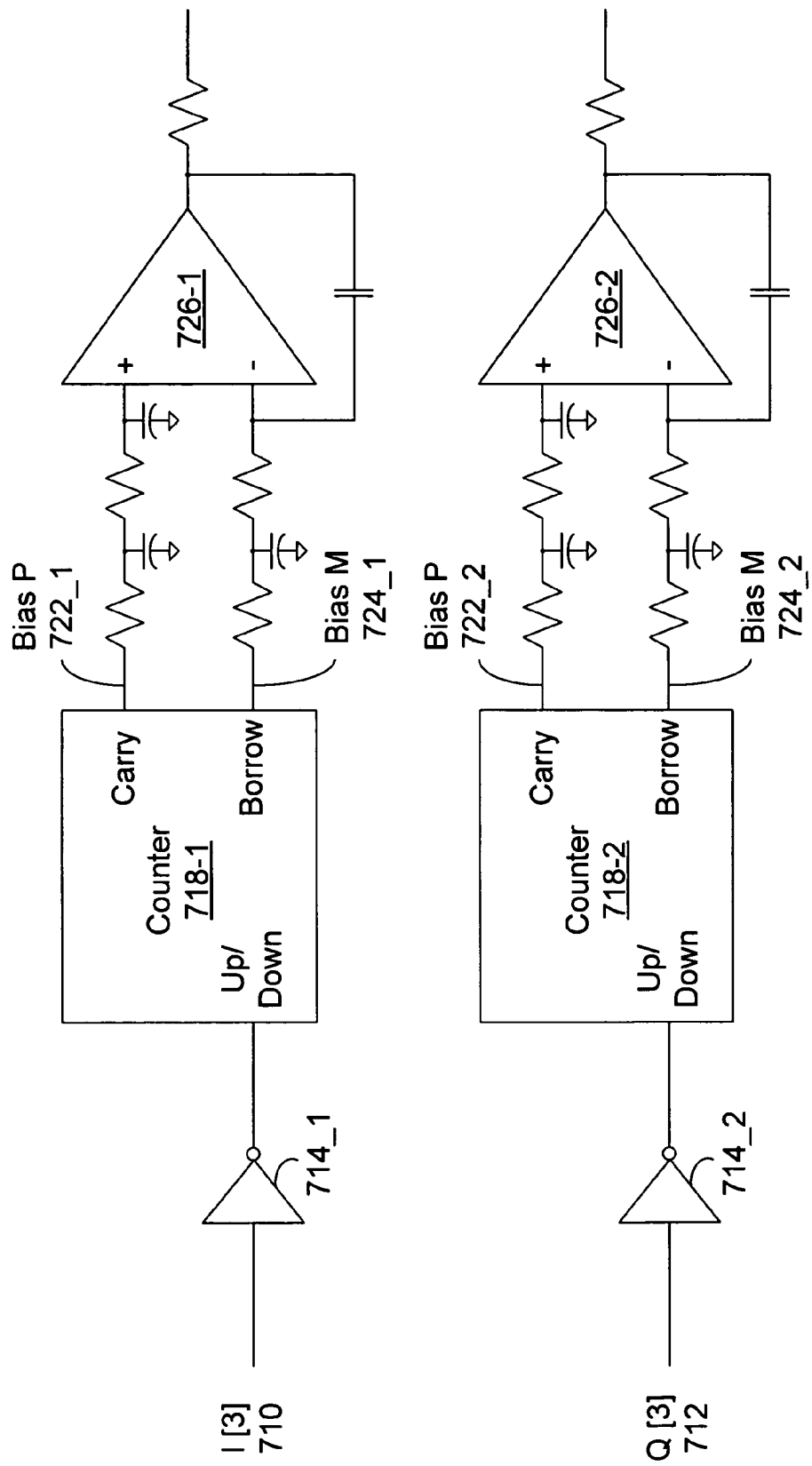
FIG. 7 is a block diagram illustrating a zero-balance circuit.

FIG. 7 illustrates an embodiment of a circuit 700 used to remove DC-biases. The circuit 700 inverts I samples 710 and Q samples 712 using inverters 714. Up/down counters 718 increment their respective counts by one if a sample is positive and decrement their respective counts by one if the sample is negative. If one of the counters 718 overflows, there is a surplus of large samples, so a pulse is applied on one Bias P 722 to a non-inverting input of one opamp 726 and one reference voltage is increased. If one of the counters 718 underflows, there is a surplus of small samples, so a pulse is applied on one Bias M 724 to an inverting input of the opamp 726 and one reference voltage is decreased. The opamps 726 and their associated feedback circuitry are selected so that an integration time of pulses is between 100 ms and 10 s. Over time, the opamps 726 integrate the feedback pulses and adjusts the reference voltages so that there are equal numbers of positive and negative samples and a mean of the I samples 710 and the Q samples 712 is zero.

Figure 8:
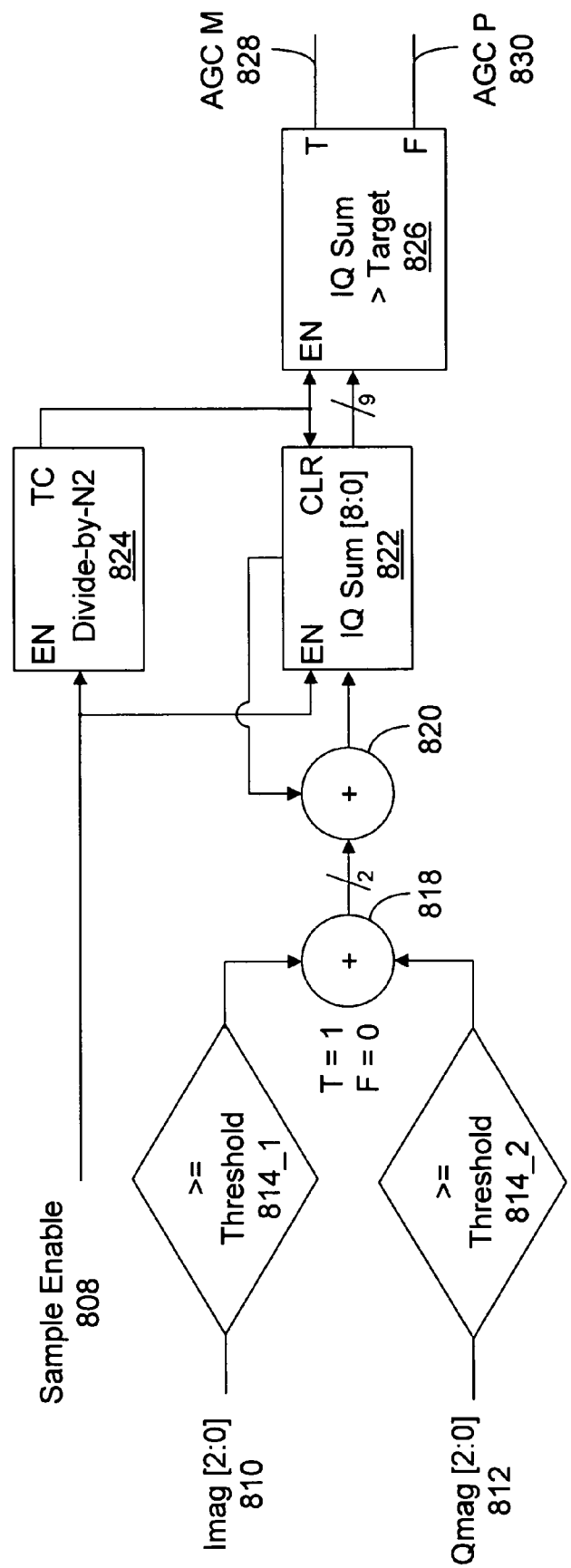
FIG. 8 is a block diagram illustrating automatic-gain-control (AGC) circuit.

As mentioned previously, the receiver 200 (FIG. 2) may monitor the A/D samples 610 (FIG. 6) and adjust the gain of one or more of the sub-channel circuits 436 (FIG. 4A) such that inputs to the A/D converters 426 are within an acceptable range. FIG. 8 illustrates an embodiment of an AGC circuit 800. The AGC circuit 800 is simple to implement, provides very good jamming resistance and is transparent to subsequent signal processing stages. A magnitude of I samples 810 and Q samples 812 is compared to an activity threshold in comparators 814. In some embodiments, the activity threshold in the comparators 814 may be adjustable. If the magnitude of the I samples 810 and/or the Q samples 812 is greater than or equal to the activity threshold, the respective samples are active. If the respective samples are less than the activity threshold, they are inactive. A number of active I samples and/or Q samples may be summed using summers 818, 820 and 822. Summation is set to a time interval of length equal to $N_2$ sample periods using divide-by-$N_2$ feedback 824. The divide-by-$N_2$ feedback 824 is gated by sample enable 808. $N_2$ is chosen so that it is not an integer divisor of a number of samples per ms (to avoid aliasing at a corresponding frequency on the IF and/or one or more clock signals, such as that used to gate at least one of the A/D converters 426 in FIG. 4A). As a consequence, the feedback rate is roughly 200 KHz and the desired activity level can be expressed accurately as a fraction of the form $M/(2*N_2)$, where M is an integer. In an exemplary embodiment, $N_2$ may equal 176.

At an end of the time interval defined by $N_2$, a count of active I samples and Q samples is compared to a target threshold in comparator 826. In some embodiments, the target threshold is programmable. If the summation is greater than the target threshold, there are too many active samples and the gain in at least one of the sub-channel circuits 436 (FIG. 4A) is reduced by sending a pulse to an inverting input of an AGC opamp on line AGC M 828. If the summation is less than the target threshold, there are too few active samples. The gain is increased by sending a pulse to a non-inverting input of the AGC opamp on line AGC P 830. The opamp and supporting circuitry may be chosen so that an effective integration time is between 100 ms and 10 s. As illustrated in the AGC circuit 800, feedback pulses are at least one sample enable 808 clock period long. A faster AGC response may be obtained by making a length of the feedback pulses proportional to an absolute value of the I summation and/or the Q summation minus the target threshold, i.e., a proportional feedback control. Note that in embodiments of the receiver 200 (FIG. 2) using 1-bit quantization in A/D converters 426 (FIG. 4A), AGC feedback may not be needed.

Figure 11:
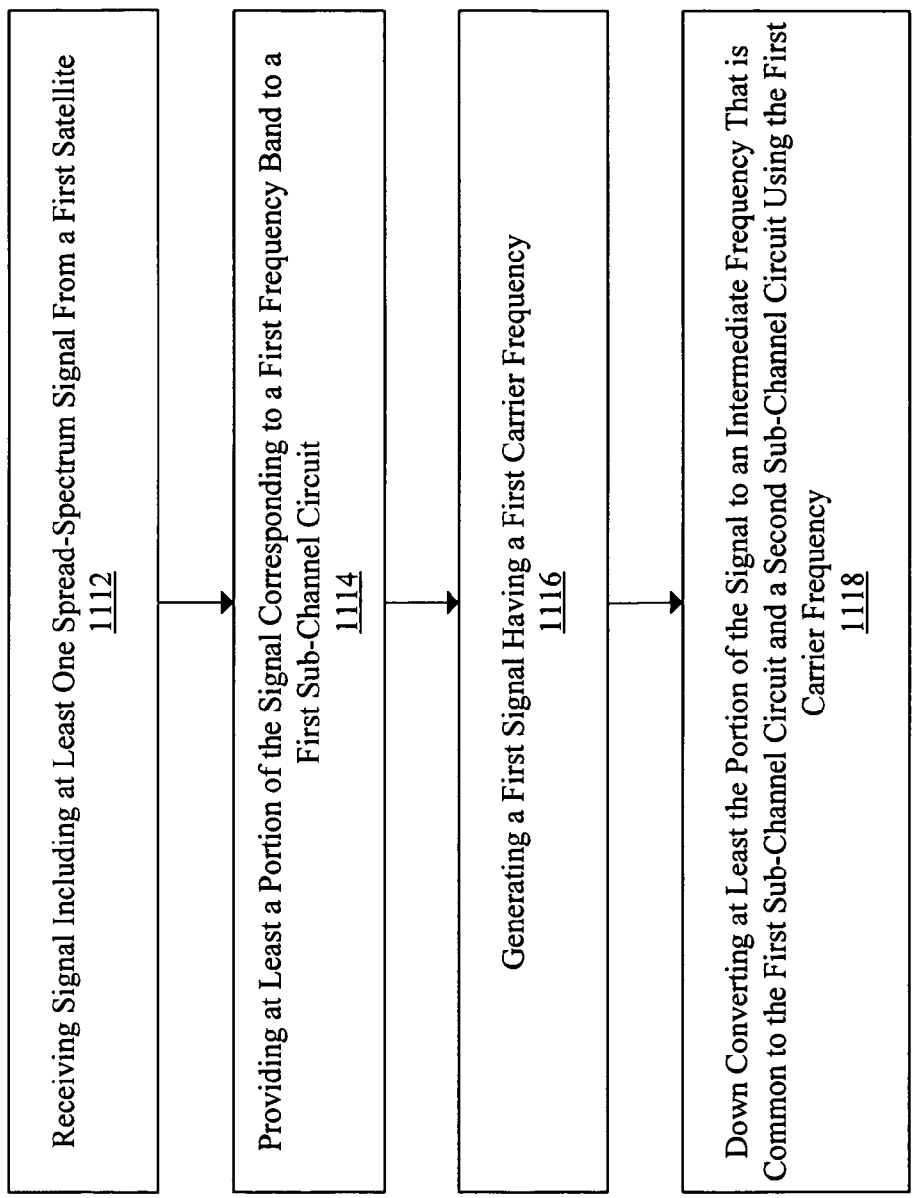
FIG. 11 is a flow diagram illustrating a method of operating a GNSS receiver.

FIG. 11 illustrates an embodiment of operations in the satellite navigation device. A signal including at least one spread-spectrum signal from a first satellite is received (1112). At least a portion of the signal corresponding to a first frequency band is provided to a first sub-channel circuit (1114). A first signal having a first carrier frequency is generated (1116). At least the portion of the signal is down converted to an intermediate frequency that is common to the first sub-channel circuit and a second sub-channel circuit using the first carrier frequency (1118). In some embodiments, there may be fewer or additional operations, an order of the operations may be rearranged and/or two or more operations may be combined.

Figure 12:
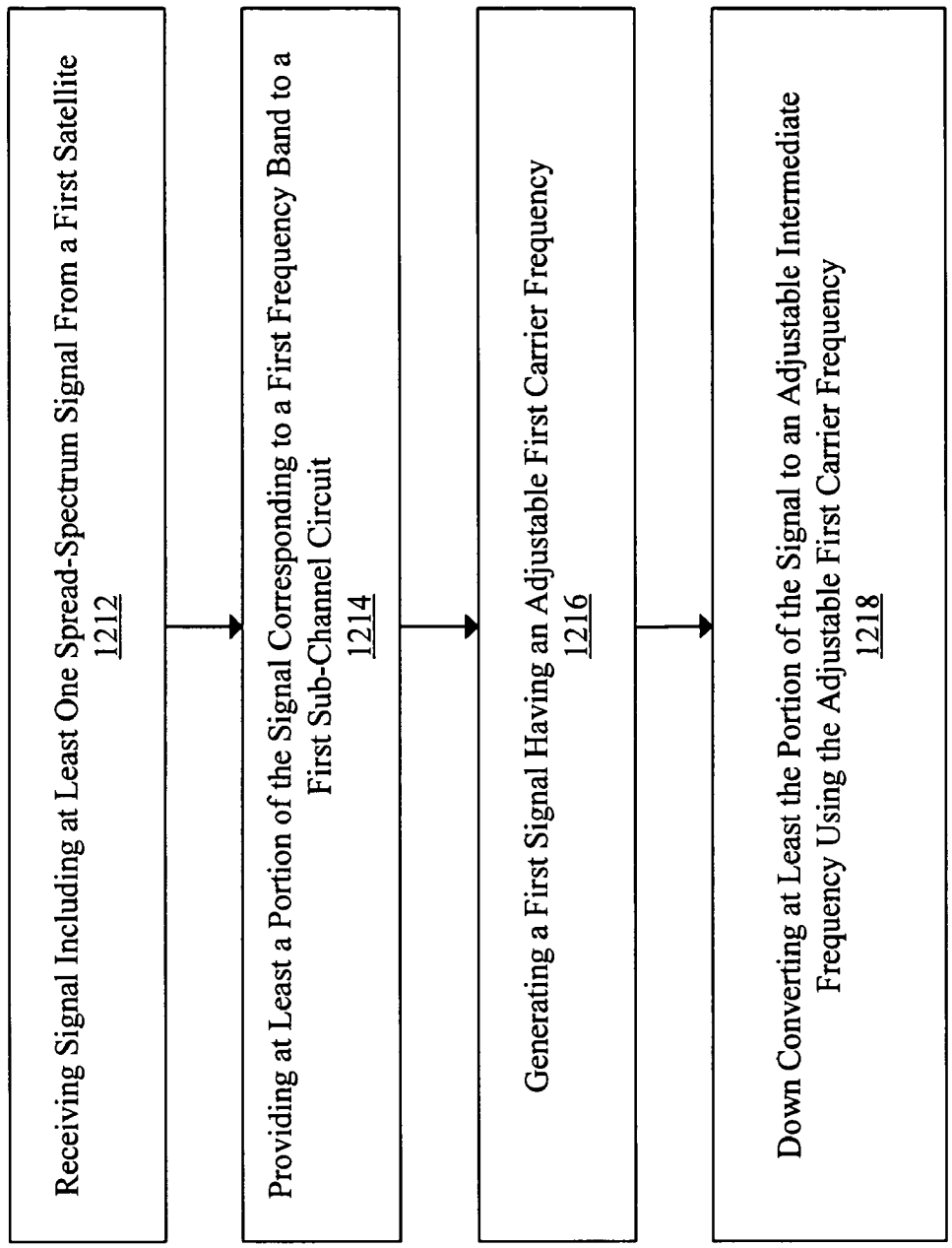
FIG. 12 is a flow diagram illustrating a method of operating a GNSS receiver.

FIG. 12 illustrates an embodiment of operations in the satellite navigation device. A signal including at least one spread-spectrum signal from a first satellite is received (1212). At least a portion of the signal corresponding to a first frequency band is provided to a first sub-channel circuit (1214). A first signal having an adjustable first carrier frequency is generated (1216). At least the portion of the signal is down converted, using the first carrier frequency, to an adjustable intermediate frequency (1118). In some embodiments, there may be fewer or additional operations, an order of the operations may be rearranged and/or two or more operations may be combined.

Figure 13:
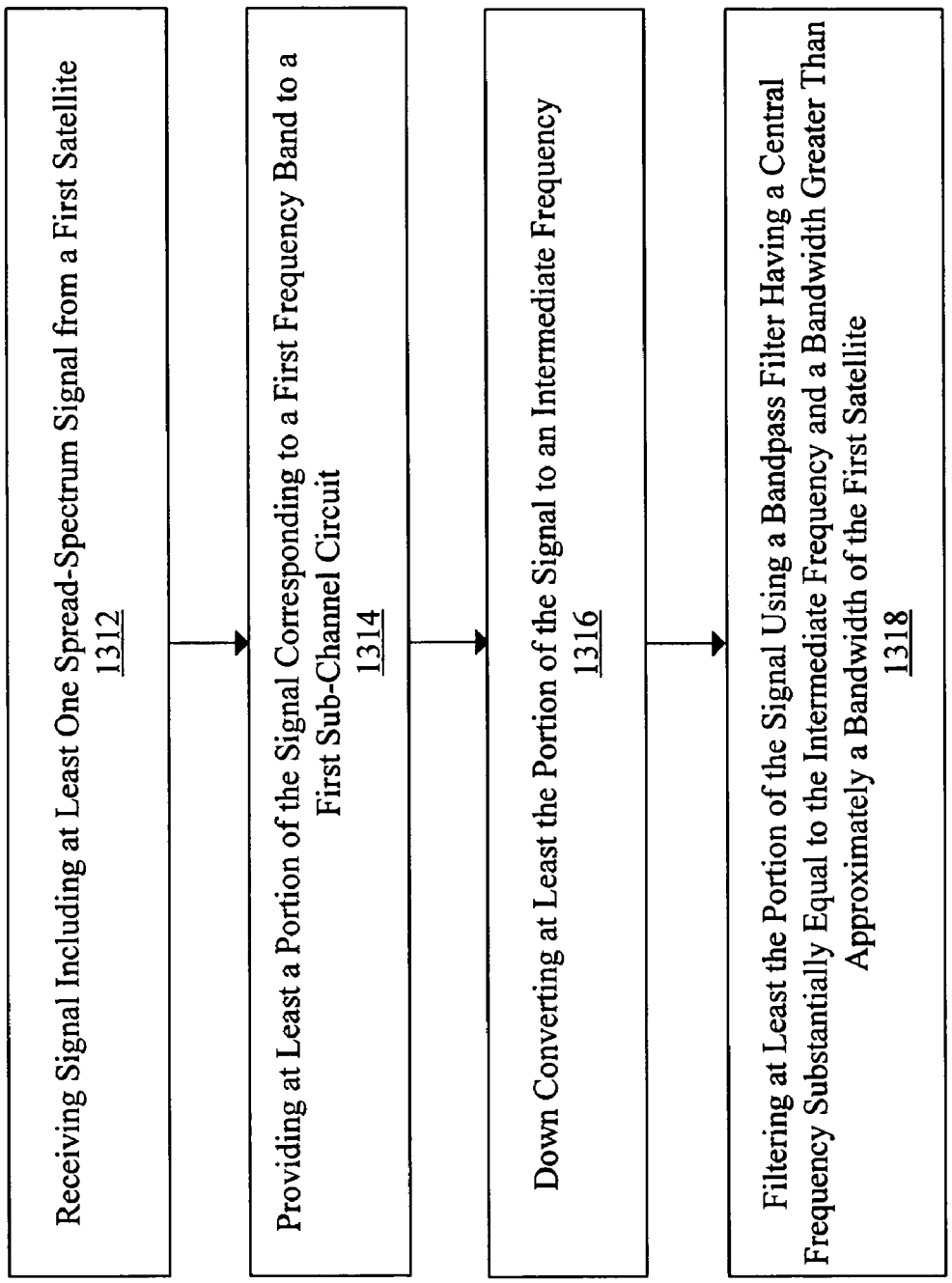
FIG. 13 is a flow diagram illustrating a method of operating a GNSS receiver.

FIG. 13 illustrates an embodiment of operations in the satellite navigation device. A signal including at least one spread-spectrum signal from a first satellite is received (1312). At least a portion of the signal corresponding to a first frequency band is provided to a first sub-channel circuit (1314). At least the portion of the signal is down converted to an intermediate frequency (1316). At least the portion of the signal is filtered using a bandpass filter having a central frequency substantially equal to the intermediate frequency and a bandwidth greater than approximately a bandwidth of the first satellite (1318). In some embodiments, there may be fewer or additional operations, an order of the operations may be rearranged and/or two or more operations may be combined.

Figure 14:
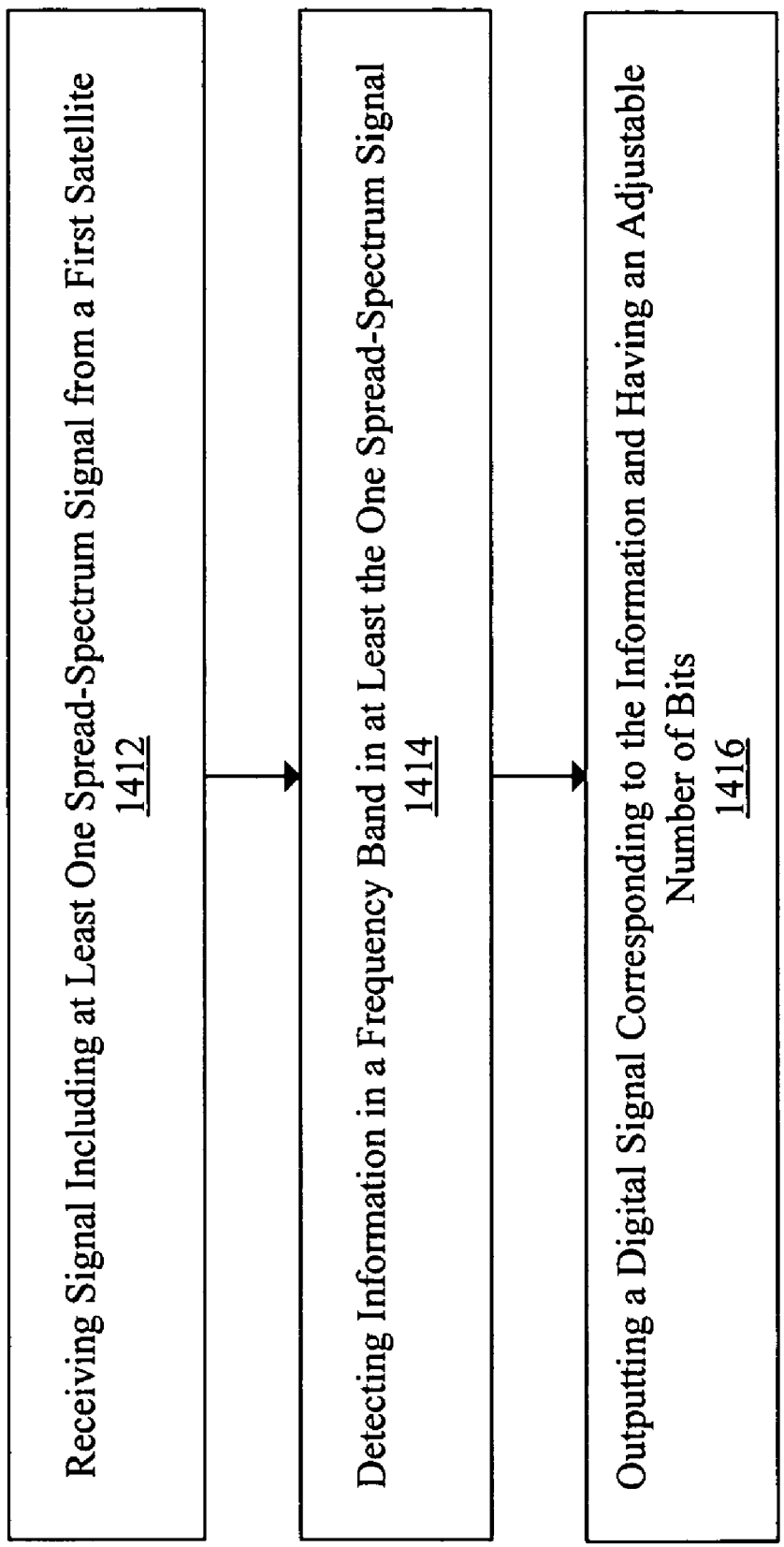
FIG. 14 is a flow diagram illustrating a method of operating a GNSS receiver.

FIG. 14 illustrates an embodiment of operations in the satellite navigation device. A signal including at least one spread-spectrum signal from a first satellite is received (1412). Information in a frequency band in at least the one spread-spectrum signal is detected (1414). A digital signal corresponding to the information and having an adjustable number of bits is output (1416). In some embodiments, there may be fewer or additional operations, an order of the operations may be rearranged and/or two or more operations may be combined.

Figure 10:
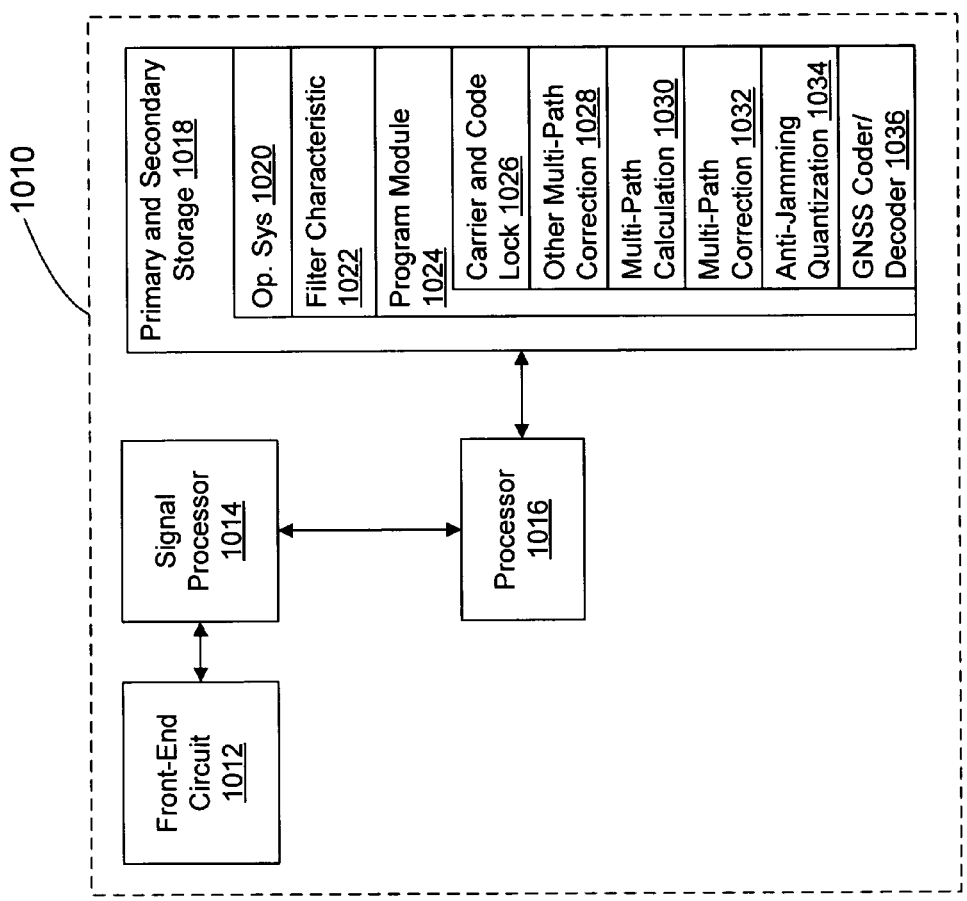
FIG. 10 is a block diagram illustrating components in a GNSS receiver.

FIG. 10 illustrates an embodiment of a device 1010, such as the device 110 (FIG. 1), in a global navigation satellite system (GNSS). The device 1110 includes a front-end circuit 1012, such as receiver 200 (FIG. 2), a signal processor 1014, such as signal processor 332 (FIG. 3), at least one processor 1016 and a memory 1018. The memory 1018, which may include high-speed random access memory and may also include non-volatile memory, such as one or more magnetic disk storage devices, EEPROM and/or Flash EEPROM, includes an operating system 1020, one or more satellite filter characteristics 1022 and at least one program module 1024, executed by processor 1016. At least the one program module 1024 includes instructions for carrier and code lock 1026, an optional other multi-path correction 1028 (such as the double-delta correction, a strobed correlator and a pulse-aperture correlator), a multi-path calculation 1030, anti-jamming quantization 1034, including an adjustable number of bits in A/D quantization, and a GNSS coder/decoder 1036. The program module 1024 may also include instructions for adjusting the IF, filters, mixers and/or LO frequencies in the front-end circuit 1012. In some embodiments there may be more than one processor 1016. In other embodiments, the device 1010 may include an application specific integrated circuit (ASIC) and some or all of the functionality of at least the one program module 1024, executed by the processor 1016, may be implemented in the ASIC.

The foregoing description, for purposes of explanation, used specific nomenclature to provide a thorough understanding of the invention. However, it will be apparent to one skilled in the art that the specific details are not required in order to practice the invention. The embodiments were chosen and described in order to best explain the principles of the invention and its practical applications, to thereby enable others skilled in the art to best utilize the invention and various embodiments with various modifications as are suited to the particular use contemplated. Thus, the foregoing disclosure is not intended to be exhaustive or to limit the invention to the precise forms disclosed. Many modifications and variations are possible in view of the above teachings.

It is intended that the scope of the invention be defined by the following claims and their equivalents.

What is claimed:

1. A satellite navigation device, comprising:
a receiver that receives a signal that includes at least one spread-spectrum signal from a first satellite, the receiver having a first channel, the first channel including:
at least two sub-channel circuits, each sub-channel circuit having a first signal generator and a first mixer, the first signal generator providing a respective first signal having a respective first carrier frequency to down convert at least a portion of the signal, using the first mixer, to an intermediate frequency that is adjustable and common to the two sub-channel circuits,
wherein the first signal generator in each of the sub-channel circuits is adjustable so as to produce a respective adjustable respective first carrier frequency in the respective first signal and the adjustable, common intermediate frequency, and
wherein each respective sub-channel circuit receives a respective frequency band in at least the one spread-spectrum signal from the first satellite.

2. The satellite navigation device of claim 1, wherein the intermediate frequency in a first sub-channel circuit and the intermediate frequency in a second sub-channel circuit differ by less than 100 kHz.

3. The satellite navigation device of claim 1, wherein the intermediate frequency is within an inclusive range of approximately 100 to 350 MHz.

4. The satellite navigation device of claim 1, the receiver further comprising an additional channel, the additional channel having at least two additional sub-channel circuits, at least the two sub-channel circuits in the first channel and at least the two additional sub-channel circuits in the additional channel having the intermediate frequency, wherein a respective additional sub-channel circuit receives an additional respective frequency band in an additional spread-spectrum signal from an additional satellite.

5. The satellite navigation device of claim 1, the first channel further comprising a second signal generator and each of at least the two sub-channel circuits further include a second mixer, the second signal generator providing a second signal having a second carrier frequency to each of at least the two sub-channel circuits in order to down convert, using the second mixer, at least the portion of the signal from the intermediate frequency to substantially baseband.

6. The satellite navigation device of claim 1, further comprising a communications link channel.

7. The satellite navigation device of claim 1, wherein the at least two sub-channel circuits comprise three sub-channel circuits to receive signals in L1, L2 and L5 frequency bands of the GPS navigation system.

8. A method, comprising:
receiving a signal that includes at least one spread-spectrum signal from a first satellite;
providing at least a portion of the signal corresponding to a first frequency band to a first sub-channel circuit;
generating a first signal having a first carrier frequency; and
down converting at least the portion of the signal corresponding to the first frequency band to an intermediate frequency using the first signal,
wherein the intermediate frequency is adjustable and common to at least a second sub-channel circuit that receives a second frequency band in the signal from the first satellite; and
wherein first carrier frequency and the common intermediate frequency are adjustable.

9. The method of claim 8, wherein the intermediate frequency is within an inclusive range of approximately 100 to 350 MHz.

10. The method of claim 8, further comprising generating a second signal having a second carrier frequency and down converting at least the portion of the signal corresponding to the first frequency band to substantially baseband in the first sub-channel circuit using the second signal.

11. The method of claim 8, wherein the intermediate frequency in the first sub-channel circuit and the intermediate frequency in the second sub-channel circuit differ by less than 100 kHz.

* * * * *